US012334720B2

(12) United States Patent
Manabe et al.

(10) Patent No.: US 12,334,720 B2
(45) Date of Patent: Jun. 17, 2025

(54) STRUCTURE FOR ATTACHING GRATING LID ONTO RESIN TROUGH BODY; TROUGH TRACK; TROUGH TRACK FORMING METHOD; AND GRATING LID

(71) Applicant: FURUKAWA ELECTRIC CO., LTD., Tokyo (JP)

(72) Inventors: Hiroki Manabe, Tokyo (JP); Takashi Hori, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 314 days.

(21) Appl. No.: 18/119,582

(22) Filed: Mar. 9, 2023

(65) Prior Publication Data

US 2023/0216287 A1     Jul. 6, 2023

Related U.S. Application Data

(63) Continuation of application No. PCT/JP2021/033625, filed on Sep. 14, 2021.

(30) Foreign Application Priority Data

Sep. 15, 2020   (JP) .................................. 2020-154918

(51) Int. Cl.
    *H02G 9/04*      (2006.01)
    *E03F 5/06*      (2006.01)

(52) U.S. Cl.
     CPC ........ *H02G 9/04* (2013.01); *E03F 5/06* (2013.01)

(58) Field of Classification Search
None
See application file for complete search history.

(56) References Cited

U.S. PATENT DOCUMENTS 5,462,383 A * 10/1995 Van 'T Veer ......... E01C 11/227
                                                               404/4
6,202,565 B1 * 3/2001 Henry .................... H02G 9/025
                                                               104/275

(Continued)

FOREIGN PATENT DOCUMENTS

GB          2490747 B   *   5/2015  ............... H02G 9/04
JP       1993030284 U      4/1993

(Continued)

OTHER PUBLICATIONS

International Search Report issued in International Patent Application No. PCT/JP2021/033625, mailed Oct. 26, 2021.

(Continued)

*Primary Examiner* — Krystal Robinson
(74) *Attorney, Agent, or Firm* — MARSHALL, GERSTEIN & BORUN LLP

(57) ABSTRACT

This resin trough body has an approximately U-shape cross-sectional shape that includes a bottom section and side sections on the two sides. Vertical reinforcement ribs are formed at a prescribed interval on the outer surface of both side sections of a trough body of a prescribed length. Further, near the front and back ends of the trough body, horizontal ribs are formed so as to link two vertical ribs. An accommodation space for accommodating a grating lid is formed by a pair of L-shape members being fixed with bolts to a fixing jig that has been attached to the horizontal ribs. The grating lid is accommodated in said accommodation space, and the grating lid is fixed to a bolt fixing section, which is a mounting hole formed in the horizontal plane of the L-shape members.

22 Claims, 16 Drawing Sheets

(56) References Cited

U.S. PATENT DOCUMENTS

| | | | |
|---|---|---|---|
| 7,556,450 B2 * | 7/2009 | Shimono | E03F 3/046 |
| | | | 404/5 |
| 2005/0055887 A1 | 3/2005 | Benesteau et al. | |
| 2020/0277739 A1 | 9/2020 | Brooker et al. | |

FOREIGN PATENT DOCUMENTS

| | | | | | |
|---|---|---|---|---|---|
| JP | 1994284544 | A | | 10/1994 | |
| JP | 2002146897 | A | | 5/2002 | |
| JP | 2003253716 | A | | 9/2003 | |
| JP | 2004076304 | A | | 3/2004 | |
| JP | 2006266029 | A | | 10/2006 | |
| JP | 2009097311 | A | | 5/2009 | |
| JP | 2009228295 | A | | 10/2009 | |
| JP | 2014011881 | A | * | 1/2014 | ........... H02G 3/0608 |
| JP | 2017038449 | A | | 2/2017 | |
| KR | 101089144 | B1 | * | 12/2011 | ........... H02G 3/0412 |
| WO | WO-2003/035983 | A1 | | 5/2003 | |
| WO | WO-2011104863 | A1 | | 9/2011 | |

OTHER PUBLICATIONS

International Preliminary Report on Patentability issued in International Patent Application. No. PCT/JP2021/033625, dated Mar. 21, 2023.
Extended European Search Report, corresponding European Application No. 21869344.8, mailing date Oct. 9, 2024.
Examination report, corresponding Australian application No. 2021345164, Oct. 29, 2024.

* cited by examiner

STRUCTURE FOR ATTACHING GRATING LID ONTO RESIN TROUGH BODY; TROUGH TRACK; TROUGH TRACK FORMING METHOD; AND GRATING LID

TECHNICAL FIELD

The present invention relates to a structure for attaching a grating lid onto a resin trough body in which cables and the like are accommodated, a trough track, a trough track forming method, and a grating lid.

BACKGROUND

Conventionally, two types of structures for electric power transmission systems have been used: one uses electrical conduit pipes buried underground, and the other uses troughs that are used beside roads and railroads. In the case of the electrical conduit pipes buried underground, once cables are inserted inside the electrical conduit pipes and laid, the cables are buried underground and thus security is high. However, such the structure has difficulties at the time of cable extension or maintenance works as well as a problem of high construction costs. By contrast, a trough track has a structure in which a trough lid can be opened, and thus extension or maintenance works of cables inside the toughs is easy and its construction cost is inexpensive.

Troughs and trough lids are typically made of resin, and there is nothing wrong with using the resin-made trough lids under normal circumstances of use. However, in a case in which motor vehicles travel across the trough lid, the trough lid is required to have higher load baring capacity. Accordingly, when the resin-made trough lid is used in the case in which the load bearing capacity is required, the trough lid is required to have an extremely large thickness to satisfy the load bearing capacity.

Up to now, when the load bearing capacity is required, a lattice-shaped metal molded grating lid as a trough lid and a concrete trough have been used. It is difficult to form the concrete trough to have a complex shape with fitting portions. In addition, the grating lid has no interconnecting structures, and thus a gap may be easily created between the grating lids, causing a problem of a gap created at a curved part of the trough track.

As such the trough structure, Japanese Unexamined Patent Application Publication No. 2004-76304 (JP-A-2004-76304) has proposed a side ditch that does not obstruct pedestrians from walking and has a drain port with high drainage efficiency. At least a part of an upper part of the side ditch of JP-A-2004-76304 has an opening, and the side ditch includes a side-ditch main body as a flow channel and a lid that is to be installed onto the opening. The side-ditch main body includes lid positioning means that is founded on a part of the side-ditch main body. When the lid is installed onto the opening of the side-ditch main body, a first drainage space having a vertically long rectangular cross section is formed by side faces of the lid and opposing side faces of the side-ditch main body on the side of the opening.

In JP-A-2004-76304, a protrusion protruding horizontally is formed on the side face of the lid that is to be installed onto the opening of the side ditch and the straight drainage space is formed along edges of the opening. This enables to build the side ditch including the drainage space having a small width that does not obstruct walking but stretching long along a longitudinal direction of the side ditch. Furthermore, there is no need to fill the drainage space with gratings or the like, and thus the side ditch with high drainage efficiency can be built at low cost. Such the concrete trough has a low workability, a difficulty in coping with curved parts, and also a security problem.

Also, Japanese Unexamined Patent Application Publication No. 2002-146897 (JP-A-2002-146897) has proposed a pad for a grating fitting port. The pad can reliably fill an opening portion, which is a fitting port of a grating. The pad is never removed by vehicles travelling over, securing safety, can prevent falling of vehicles or pedestrians into the opening portion, and can be handled easily when the grating is to be removed at occasions such as regular inspections.

To install and fix the grating, the pad for the grating filling port of JP-A-2002-146897 is formed of a lump body having a plan view shape slightly larger than the opening of the fitting port opened at a part of a grating surface. The lump body is formed of an elastic body such as rubber, having a small hole for extraction provided from an upper face through to a bottom face. The lump body is stored inside the fitting port by pressing the lump body into the fitting port.

The grating lid of JP-A-2002-146897 improves security by pressing and disposing the lump body onto the upper part of the fitting portion of the grating lid. However, the invention in JP-A-2002-146897 relates to a structure in which the grating lid is attached directly to a concrete made trough body, and is not for disclosing a structure for attaching the grating lid onto a resin-made trough body.

Also, Japanese Unexamined Patent Application Publication No. 2006-266029 (JP-A-2006-266029) has proposed a water-permeable groove lid that can replace cast-iron grating lid or steel grating that have been widely used. The water-permeable groove lid of JP-A-2006-266029 is disposed in a side ditch or a drain of a road or a park, and has a sufficient drainage function while maintaining a strength that can bear the load required at the location of use. The invention according to JP-A-2006-266029 can provide the lightweight and economical water-permeable scenic groove lid that can also improve scenery and walking sensation.

In more detail, the invention according to JP-A-2006-266029 is formed, as a unified body, by paving water-permeable resin mortar via a steel plate having permeable holes or perforated metal on an upper surface of a steel frame and smoothing the surface. Also, upper edges of four side plates of the steel frame are adjusted to be on the same horizontal plane with the surface of the paved water-permeable resin mortar. In this way, the water-permeable scenic groove lid of JP-A-2006-266029 is formed, as the unified body, by paving the water-permeable resin mortar formed of a mixture of particle aggregate and synthetic resin binder, via the steel plate having permeable holes or the perforated metal on the upper surface of the steel frame surrounded by four side plates, and by smoothing the surface.

JP-A-2006-266029 discloses the water-permeable groove lid in which the steel plate having permeable holes or the perforated metal covered with the water-permeable resin mortar is disposed on the upper surface of the steel grating frame. An attachment member is disposed on the upper surface of the water-permeable groove lid, and the water-permeable resin mortar is fixed to the steel grating frame with a bolt. However, JP-A-2006-266029 does not disclose a structure for fixing such the grating-lid-type water-permeable groove lid to a trough.

Also, Japanese Unexamined Patent Application Publication No. 2006-266029 (JP-A-2006-266029) has proposed a grating lid that can be disposed on U-shaped groove such as a side ditch or crossing ditch of a road. Since the grating lid of JP-A-2006-266029 has a triangular plan view, the grating lid can be disposed with less rattling.

The cast-iron triangular-shaped grating lid of JP-A-2006-266029 is provided with a hook-shaped projection and a hook-shaped concave space for receiving the hook-shaped projection on each side of the adjacent groove lids that are to be engaged. By engaging the projection and the concave space, the side ditch can be blocked up stably and continuously without any gaps. Although JP-A-2006-266029 describes an arrangement relationship between the adjacent triangular groove lids on the upper surface of the U-shaped groove, the triangular groove lid does not have fixing means to the U-shaped groove, and a fixing structure to the U-shaped groove is not disclosed herein.

Also, Japanese Unexamined Patent Application Publication No. 2003-253716 JP-A-2003-253716) has proposed a drainage inlet structure that is to be provided on a floor surface of a kitchen in a food supplying facility such as a restaurant or a school meal center. According to the drainage inlet structure of JP-A-2003-253716, there is no need to provide an inclined plate to be positioned between main bars that are adjacent to a grating groove lid by welding. Thus, it is easy to manufacture the grating groove lid, and drainage above support frames, which support both side edges of the grating groove lid, is possible.

The drainage inlet structure of JP-A-2003-253716 is provided with a pair of the long support frames. Lower ends of the support frames are attached to upper ends of either sides of a long trough, on inner face sides of the trough along a longitudinal direction of the trough. A board part of the support frame supporting both side edges of the grating lid is inclined downwardly toward the trough. The lower ends at both ends of the main bar of the grating groove lid each has a notch so that the lower end inclines upwardly at the same angle as an angle of inclination of the board part of the support frame. The notch is placed on the inclined board part of the support frame to support the grating groove lid.

JP-A-2003-253716 discloses the structure in which the grating groove lid is disposed on the upper surface of the trough. However, the grating lid of JP-A-2003-253716 has a structure supported on both sides by the support frames, and load on the support frames is received by mortar. That is, the trough does not receive the load of the grating lid in the structure. Also, the invention of JP-A-2003-253716 is for a use of a drainage inlet structure that is to be provided on kitchen floors, and thus load bearing capacity of the grating groove lid is not considered for the structure therein.

As mentioned above, there is nothing wrong with using a resin-made trough body and a resin-made trough lid under normal circumstances of use. However, if heavy vehicles travel across the trough lid, the trough lid is required to have large load bearing capacity. To satisfy the load bearing capacity while using such the resin-made trough lid, it is necessary to excessively increase a thickness of the trough lid. However, when designing a new resin-made trough lid, it is required not only to increase the thickness but also to consider dispersion of stress applied onto the resin lid. In addition to such problems, the trough body is to be laid deeper in the ground, and this may increase the cost and may also unavoidably change the construction method.

Conventionally, if such the load bearing capacity is required, a concrete trough as a trough body and a metal molded grating lid as a trough lid have been used. Unfortunately, the concrete trough is heavy, which results in poor handling performance, and also has a problem that it is difficult to be formed into a complex shape having fitting portions.

SUMMARY OF THE DISCLOSURE

The present invention was made in view of such problems. It is an object of the present invention to provide a structure for attaching a grating lid onto a resin-made trough body, a trough track, a trough track forming method, and a grating lid, in which the resin-made trough body is used in place of a concrete-made trough to achieve weight reduction and thus the structure has an excellent handling performance and load bearing capacity.

To achieve the above object, a first aspect of the present invention is a structure for attaching a grating lid onto a resin-made trough body. The trough body has a substantially U-shaped cross section having a bottom section and two side sections. On outer faces of both side sections of the trough body having a predetermined length, vertical ribs for reinforcement are formed at regular intervals. The two vertical ribs are formed in proximities of each of front and back ends of the trough body, and a horizontal rib for attaching an L-shape member is formed at the proximities of each of the front and back ends of the trough body so as to link the two vertical ribs. The predetermined number of the vertical ribs are disposed at regular intervals between the vertical rib at the front end and the vertical rib at the back end of the trough body, and another horizontal rib is further formed at a bottom part of the side section of the trough body so as to link the vertical ribs. L-shape members are disposed such that a horizontal surface of a steel material having an L-shape cross section of each of the L-shape members faces a metallic fixing member of the horizontal rib, covering top parts of the side sections of the trough body. An accommodation space for accommodating the grating lid is formed by the L-shape members being fixed with bolts to the metallic fixing members attached to the horizontal ribs. The grating lid is accommodated in the accommodation space, and the grating lid is fixed to bolt fixing sections, which are mounting holes formed in the horizontal surfaces of the L-shape members. Note that the number and intervals of the vertical ribs can be appropriately determined considering the width and thickness of the vertical ribs on the conditions that the load bearing capacity of the trough can be improved and the load of the grating lid is supported. Nevertheless, the equal intervals are not necessary but preferable, and the number of the vertical ribs is preferably five or more, for example.

Preferably, the grating lid includes a grating structure including a substantially rectangular frame body and multiple gratings that are formed inside the frame body. The gratings are formed of multiple flat steel plates and steel rods, the flat steel plates being disposed across long sides at regular intervals, being parallel to short sides and linking the long sides, and the steel rods being disposed over an upper surface of the lid at regular intervals, being parallel to the long sides and linking the short sides. The bolt fixing sections are formed at two predetermined positions at proximities of each of the front and back ends of the grating lid, in which the positions are substantially symmetric in a width direction of the grating lid and do not interfere with the gratings, each of the bolt fixing sections being formed by welding to the positions a steel plate with a mounting hole formed with a mounting hole. Also, preferably, an L-shape flange member that is bent into an L shape is fixed to an outer surface of one short side of the frame body of the grating lid, the L-shape flange member being fixed forming a tongue-shaped projection that has a length equivalent to a connected part between the trough bodies. The L-shape flange member is preferably fixed to the outer surface of the one short side of the frame body of the grating lid by welding.

The grating lid may be attached onto the trough body via the L-shape member by providing the metallic fixing member having a U-shaped cross section at the mounting portion for metallic fixing members of the horizontal rib, fixing the metallic fixing member and the L-shape member with a nut and a bolt for attachment, and fixing the grating lid to the L-shape member.

With the L-shape member being attached via the metallic fixing member to the mounting portion for metallic fixing members of the trough body, another mounting hole, which is provided on the L-shape member being positioned on an inner side of the cross section of the trough body with respect to tip end parts of the both side sections of the trough body, and the steel plate with mounting hole of the grating lid, which is formed by welding the steel plate with the mounting hole to a back surface of the grating lid, may be disposed so that positions of the holes match one another. Thus, the steel plate with the mounting hole is fixed to the L-shape member, thereby fixing the grating lid with bolts onto the trough body.

Inner parts of the gratings of the grating lid may be filled with either by aggregate including at least one of ceramics and natural stones that is solidified by adhesive resin such as epoxy resin or urethane resin, or by mortar.

Instead of attaching the L-shape members for accommodating the grating lid, a resin-made trough lid may be fixed directly to the mounting portions for metallic fixing members of the horizontal ribs.

According to the first aspect of the present invention, by fixing the grating lid onto the resin-made trough body, the required load bearing capacity can be satisfied when a vehicle travels across over the trough lid. At the same time, since the resin-made trough body is used, excellent handling performance can be obtained. As above, with the structure for attaching the grating lid onto the trough according to the present invention, the grating lid can be attached onto the trough body in a simple structure, ensuring the load bearing capacity required when a vehicle travels across the grating lid.

Also, by attaching the L-shape members to the horizontal ribs on the outer surfaces of the both side sections of the trough body, a rib structure including the horizontal ribs and vertical ribs on the side sections of the trough body can receive the horizontal load applied by vehicles travelling over the grating lid. At this time, upper ends of the side sections of the trough body can directly receive vertical load, and thus the rib structure and the side sections share a role of a pressure receiving part for the vehicle load. At this time, since the vertical ribs reinforce the side sections and prevent deformation of the side sections, the vertical ribs support the vertical load secondary.

Also, the L-shape flange member, which is bent into an L shape, is provided on the outer surface of one of the short sides of the frame body of the grating lid, and such the L-shape flange member can serve as an interconnecting structure for the grating lids. Thus, even if there is a curved part in a trough track, the grating lids can completely block up an upper part of a space created by the trough track.

Also, the L-shape flange member of the grating lid is put underneath the other adjacent grating lid. That is, the adjacent grating lid is mounted onto a part of the grating lid. For this reason, the grating lid cannot be opened because of the adjacent grating lid, and this can prevent cables laid inside the trough bodies from being stolen or the like. Thus, the L-shape flange member can improve security performance, preventing the cables inside the trough bodies from being stolen or damaged by fallen foreign materials.

Also, by fixing the metallic fixing members to the horizontal ribs, the L-shape member can be easily fixed to the trough body.

Also, another mounting hole, which is provided on the L-shape member, and the steel plate with mounting hole, which is formed by being welded to the back surface of the grating lid, are disposed such that positions of the holes match one another. This can easily fix the grating lid with bolts onto the trough body.

Also, if the inner parts of the gratings of the grating lid are filled with either by aggregate including at least one of ceramics and natural stones that is solidified by adhesive resin such as epoxy resin or urethane resin, or by mortar, the grating can be blocked. This can improve the security performance, preventing the cables inside the trough bodies from being damaged by fallen foreign materials.

Also, a conventional fixing structure can be obtained by fixing the resin-made trough lid directly to the mounting portion for metallic fixing members, instead of attaching the L-shape members.

Also, a second aspect of the present invention is a structure for attaching a grating lid onto a resin-made trough body. The trough body includes a substantially U-shaped cross section having a bottom section and two side sections. The trough body having a predetermined length is provided with a male fitting portion on one end and a female fitting portion on the other end. The male fitting portion and the female fitting portion can be fitted with each other. The male fitting portion has a reduced diameter portion at which a cross section of the male fitting portion has a reduced diameter, and an enlarged diameter portion being formed at a tip end of the reduced diameter portion where the cross section is bent outward. The female fitting portion has an enlarged diameter portion at which a cross section of the female fitting portion has an enlarged diameter for accommodating the male fitting portion, and a reduced diameter portion being formed at a tip end of the enlarged diameter portion where the diameter of the cross section is reduced. Vertical ribs for reinforcement are formed at regular intervals on outer faces of both side sections of the trough body having the predetermined length. The two vertical ribs are formed in proximities of each of front and back ends of the trough body, and a horizontal rib for attaching an L-shape member is formed at the proximities of the front and back ends of the trough body so as to link the two vertical ribs. The predetermined number of the vertical ribs are disposed at regular intervals between the vertical rib at the front end and the vertical rib at the back end of the trough body, and another horizontal rib is further formed at a bottom part of the side section of the trough body so as to link the vertical ribs. L-shape members are disposed such that a horizontal surface of a steel material having an L-shape cross section of each of the L-shape members faces a metallic fixing member of the horizontal rib, covering top parts of the side sections of the trough body. An accommodation space for accommodating the grating lid is formed by the L-shape members being fixed with bolts to the metallic fixing members attached to the horizontal ribs. The grating lid is accommodated in the accommodation space, and the grating lid is fixed to bolt fixing sections, which are mounting holes formed in the horizontal surfaces of the L-shape members. Although the number of the vertical ribs can be appropriately determined considering the width and thickness of the vertical ribs as mentioned above, the number of the vertical ribs is preferably five or more, for example.

Preferably, the grating lid includes a grating structure including a substantially rectangular frame body and multiple gratings that are formed inside the frame body. The bolt fixing sections are formed at two predetermined positions at the front and back ends of the gratings, respectively, each of the bolt fixing sections being formed by notching a part of the gratings and welding to the notched part a steel plate with a mounting hole formed with a mounting hole. An L-shape flange member, which is bent into an L shape, is fixed to an outer surface of one short side of the frame body of the grating lid, the L-shape flange member being fixed forming a tongue-shaped projection that has a length equivalent to a connected part between the trough bodies. The L-shape flange member is preferably fixed to the outer surface of one of the short sides of the frame body of the grating lid by welding.

The grating lid may be attached onto the trough body via the L-shape member by providing the metallic fixing member having a U-shaped cross section at the mounting portion for metallic fixing members of the horizontal rib, fixing the metallic fixing member and the L-shape member with a bolt, and fixing the grating lid to the L-shape member.

A mounting hole, which is provided on the L-shape member being positioned on an inner side of the cross section of the trough body with respect to tip end parts of the both side sections of the trough body, may be fixed with bolt to the bolt fixing section of the grating lid. The bolt fixing section is formed by notching a part of the gratings and welding to the notched part the steel plate with the mounting hole, thereby fixing the grating lid with bolts onto the trough body.

Inner parts of the gratings of the grating lid may be filled with either by aggregate including at least one of ceramics and natural stones that is solidified by adhesive resin such as epoxy resin or urethane resin, or by mortar.

A steel plate having a surface provided with pear-skin finish (nashiji finish) or nonslip processing may be welded onto an upper surface of the grating lid.

Instead of attaching the L-shape members for accommodating the grating lid, a resin-made trough lid may be fixed directly to the mounting portions for metallic fixing members of the horizontal ribs.

According to the second aspect of the present invention, the same effects as in the first aspect of the present invention can be obtained. Also, forming the male fitting portion and the female fitting portion on both sides of the trough body can easily link together the trough bodies.

Also, welding the steel plate having the surface provided with pear-skin finish (nashiji finish) or nonslip processing can prevent pedestrians walking over the trough track from slipping.

A third aspect of the present invention is a trough track including the structure for attaching the grating lid onto the trough body according to the second aspect of the present invention, in which the trough track is formed by repeatedly interconnecting a large number of the trough bodies and the grating lids, respectively.

The trough track may include, at least partly, a curved part. The troughs are usually provided beside various types of roads, and thus the trough track often includes curved parts in practice.

Also, the trough track may be formed by repeatedly interconnecting a large number of the trough bodies and the grating lids, and the grating lids without L-shape flange members may be placed at regular intervals to cover a part of straight sections of the trough track. This can eliminate overlapping between the grating lid and the L-shape flange member, facilitating removal of the grating lid.

Instead of attaching the grating lids, the plurality of resin-made trough lids may be continuously connected and directly fixed to the mounting portions for metallic fixing members of the horizontal ribs at a part of the trough track such that the trough track covered with the grating lids and the trough track covered with the resin-made trough lids are continuously formed.

According to the third aspect of the present invention, by interconnecting the trough bodies by fitting each other's male fitting portion and female fitting portion and placing the grating lids onto the trough bodies, it is possible to obtain the trough track in which the structures for attaching the grating lid onto the trough body are continuously built.

Also, although straight sections of the trough track may be formed by abutting on one another the structures for attaching the grating lid onto the trough body, the trough track usually includes curved parts. Due to this, the male fitting portion and the female fitting portion are formed at the front and back ends of the trough body and the connected part between the male fitting portion and the female fitting portion is provided with a fitting margin, which can cope with the track having the curved parts.

Also, in a case in which such the curved parts are formed, by providing the L-shape flange member at an end part of the grating lid as the interconnecting structure of the grating lids, it is possible to prevent a gap to be created between the grating lids disposed side by side in the trough track.

Also, by not providing the L-shape flange member for the grating lid at a part of the trough track, the grating lid can be opened or closed easily. Thus, using the grating lids without the L-shape flange members at predetermined intervals can improve maintenance performance of the inner part of the trough bodies.

Also, an attaching position of the trough lid onto the trough body in the structure for attaching the grating lid is formed at the same position as an attaching position of the trough lid onto the trough body in a structure for attaching the resin-made trough lid. In addition, the grating lid and the resin-made trough lid are formed so as to have the same width and height. Thus, it is possible to attach either the grating lid or the resin-made trough lid onto the same trough body. Thus, the grating lid and the resin-made trough lid can be used accordingly in the trough track.

As above, instead of attaching the grating lid, the resin-made trough track may be fixed to the trough body at a part of the trough track. In this way, the grating lids having higher load bearing capacity can be used at some parts, and the lightweight resin-made trough lids can be used at the other parts. More specifically, the continuous trough track can be formed by using the grating lids at parts where a large load such as T25 is required and using the resin-made trough lids at parts where only the load of ordinary pedestrian walking is expected.

As above, only a part of the trough track sections requires the load bearing capacity. Thus, by fixing the grating lids for the section that requires the load bearing capacity and using the conventional resin-made trough lids at the sections that do not require the load bearing capacity, the trough track that excels also in install workability can be obtained.

A fourth aspect of the present invention is a trough track forming method using the structure for attaching the grating lid onto the trough body according to the second aspect of the present invention. The method includes interconnecting together the trough bodies by fitting the male fitting portion of the first trough body with the female fitting portion of the second trough body, and using the two grating lids and mounting one of the grating lids onto the L-shape flange member of the other grating lid so as to interconnect the grating lids. The method further includes interconnecting the male fitting portion and the female fitting portion of the trough bodies, thereby forming a track in which a large number of the grating lids and the trough bodies are repeatedly interconnected with one another, respectively.

Preferably, the trough bodies and the grating lids are disposed such that a direction of the male fitting portion of the trough body is opposite to a direction of the L-shape flange member of the grating lid.

According to the fourth aspect of the present invention, the trough track can be formed by disposing the L-shape flange member on one end of the grating lid as an interconnecting mechanism and mounting the other end of the grating lid on which the L-shape flange member is not disposed onto the L-shape flange member of the adjacent grating lid.

At this time, the direction of the male fitting portion of the trough body is disposed to be opposite to the direction of the L-shape flange member of the grating lid. Thus, the installation direction of the trough bodies and the installation direction of the grating lids are the same, and trough bodies and the grating lids can be constructed simultaneously.

A fifth aspect of the present invention is a grating lid that is to be fixed on an upper part of side sections of a trough body. The grating lid includes a structure in which multiple gratings are formed inside a substantially rectangular-shaped frame body. A part of the gratings is notched at proximities of each of the front and back ends of the grating lid. A steel plate with a mounting hole is welded to the notched parts to form bolt fixing sections of the grating lid. An L-shape flange member, which is bent into an L shape, is fixed to one side of a longitudinal direction of the grating lid, the L-shape flange member being formed with a tongue-shaped projection that has a length equivalent to a connected part between the trough bodies. The L-shape flange member is preferably fixed by welding to the one short side of the longitudinal direction of the frame body of the grating lid.

Inner parts of the gratings of the grating lid may be filled with either by aggregate including at least one of ceramics and natural stones that is solidified by adhesive resin such as epoxy resin or urethane resin, or by mortar.

An LED light source, which is mounted on a substrate, may be disposed inside at least a part of the gratings. The LED light source may be fixed with epoxy resin or urethane resin that is filled inside the gratings, and the substrate may be disposed on a back surface of the grating lid, or on an upper surface of the L-shape member.

According to the fifth aspect of the present invention, by providing the L-shape flange member, which is bent into an L shape, onto the outer surface of the one short side of the frame body of the grating lid, the L-shape flange member can improve security performance, preventing the cables inside the trough bodies from being stolen or damaged by fallen foreign materials. In the present application, the security performance includes prevention of theft, prevention of damages caused by fallen foreign materials, as well as prevention of burning of the cables due to fallen flammable substances.

Also, if the inner parts of the gratings of the grating lid are filled with either by aggregate including at least one of ceramics and natural stones that is solidified by adhesive resin such as epoxy resin or urethane resin, or by mortar, the gratings can be blocked up.

Also, disposing the LED light sources on the grating lid can give some decorations thereto.

The present invention can provide a structure for attaching a grating lid onto a resin-made trough body, a trough track, a trough track forming method, and a grating lid. The resin-made trough body is used in place of a concrete-made trough to achieve weight reduction and thus the structure has an excellent handling performance and load bearing capacity.

According to the above-mentioned structure for attaching the grating lid onto the resin-made trough body according to an embodiment of the present invention, the grating lid can be attached onto the trough body in a simple structure. Also, in cases in which vehicles travel across the grating lid, attaching the grating lid onto the resin-made trough body can ensure the load bearing capacity of the trough body and the grating lid.

Furthermore, the grating lids can form a connected structure that can block up the upper part of the resin-made trough bodies. Thus, even if there is a curved part in the trough track, the grating lids can completely block up the upper part of the space created by the trough track. This enables to prevent cables from being stolen, damaged by fallen foreign materials, burned by fallen flammable substances, and so on, and thus the trough track that excels in security performance can be obtained.

DETAILED DESCRIPTION

Figure 1:
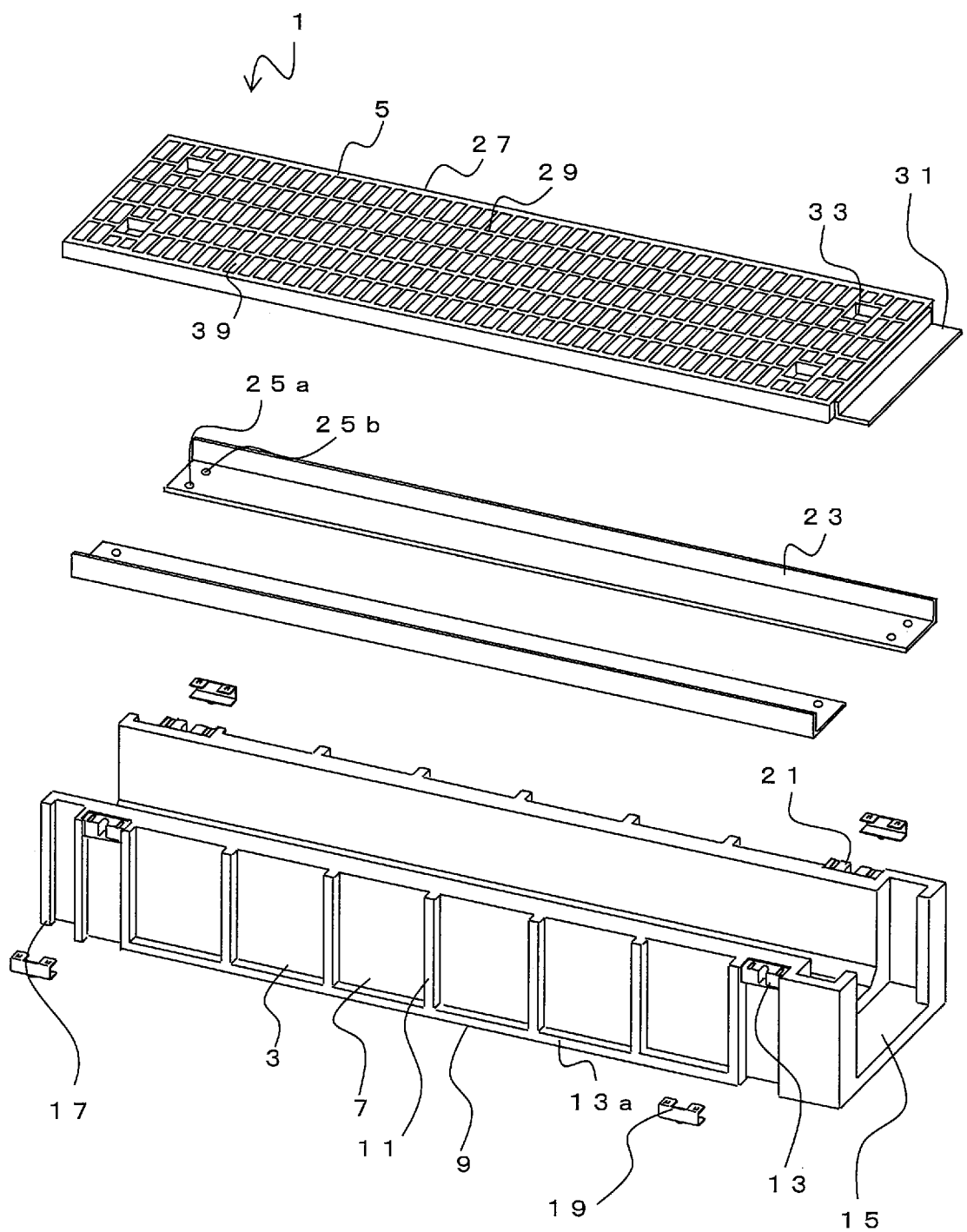
FIG. 1 is an exploded perspective view showing a structure 1 for attaching a grating lid onto a trough body.

Hereinafter, some embodiments of the present invention will be described with reference to the accompanying drawings. FIG. 1 is an exploded perspective view showing a structure 1 for attaching a grating lid onto a trough body according to an embodiment of the present invention.

The structure 1 for attaching a grating lid onto a trough body mainly includes a trough body 3, a grating lid 5, and L-shape members 23. The trough body 3 is made of resin and molded by press molding or injection molding, for example. The trough body 3 has a substantially U-shaped cross section with a bottom section 9 and a side section 7 on each side.

On an outer face of the side section 7 on either side of the trough body 3 of a predetermined length, vertical ribs 11 for reinforcement are formed at predetermined intervals. In more detail, two of the vertical ribs 11 are formed at a front end and a back end of the trough body 3, respectively, and predetermined number (five in the drawing) of the vertical ribs 11 are disposed at regular intervals between the vertical rib 11 at the front end and the vertical rib 11 at the back end of the trough body 3. Also, in proximities of the front and back ends of the trough body 3, horizontal ribs 13 for attaching an L-shape member, which will be described below, are formed so as to link the two vertical ribs 11. Furthermore, at the bottom of the side section 7, another horizontal rib 13a is formed so as to link the vertical ribs 11. A metallic fixing member 19 having a U-shaped cross section is provided at a mounting portion 21 for metallic fixing members of the horizontal rib 13. The structure of the metallic fixing member 19 will be described below. Here, although the size of each part of the trough body 3 depends on the size of the trough product, followings are examples to be set for each size: the side wall 7 has a wall thickness of 9-12 mm, a bottom face has a thickness of 10-15 mm, the vertical rib 11 has a thickness of 10 mm or more, the horizontal rib 13a at the bottom part of the side wall 7 has a thickness of 10 mm or more, and the horizontal rib 13 for attaching the L-shape member has a thickness of approximately 20 mm and a length of approximately 50 mm.

Here, as the vertical ribs of the female fitting portion 15 at the proximity of the end part of the trough body 3, a bent portion of a female fitting portion may serve as the vertical ribs, or, alternatively, two independent vertical ribs may be provided. It is needless to say that, for the trough body having no fitting portions, two independent vertical ribs as above are required at the front and back ends.

A male fitting portion 17 and the female fitting portion 15, which can be fitted with each other, are provided on one end and the other end of the trough body 3 having a predetermined length, respectively. The plurality of the trough bodies 3 can be interconnected together by fitting the male fitting portion 17 and the female fitting portion 15 of the adjacent trough bodies 3. The structures of the male fitting portion 17 and the female fitting portion 15 will be described in detail below. Also, in the present embodiment, an example in which the trough body 3 is formed with the male fitting portion 17 and the female fitting portion 15 on each end thereof. However, such the fitting portions are not always necessary. When trough bodies 3 having no fitting portions on both end parts are used to form a trough track, the trough bodies 3 are disposed so that the end parts thereof are abutted on one another.

The grating lid 5 includes gratings 29 formed inside a substantially rectangular-shaped metal-made frame body 27. Also, filler 39 fills inner parts of the gratings 29 of the grating lid 5. The filler 39 is formed of either aggregate including at least one of ceramics and natural stones that is solidified by adhesive resin such as epoxy resin or urethane resin, or of mortar, for example. For example, for the trough body having a width of 200 mm, the grating lid 5 has a top plate thickness of 4 mm, and an overall size of 995 mm long, 252 mm wide, and 29 mm high; a steel material forming the frame body 27 of the grating lid 5 has a thickness of 4.5 mm and a height of 25 mm; the size of each of the gratings 29 of the grating lid 5 is 50 mm by 30 mm; and a thickness of a steel material of the gratings is 5 mm.

Figure 2:
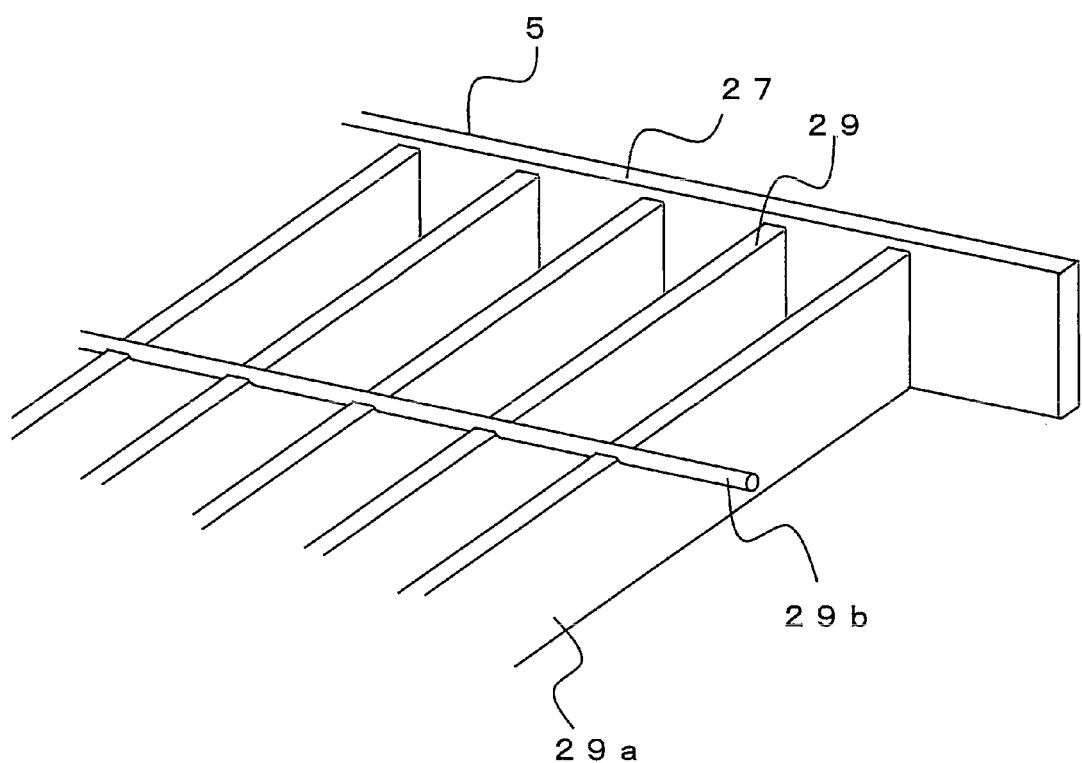
FIG. 2 is a partially enlarged view of gratings 29 of a grating lid 5.

FIG. 2 is a partially enlarged perspective view of the gratings 29 of the grating lid 5 in which the filler 39 is perspective. The gratings 29 are formed of multiple flat steel plates 29a and steel rods 29b. The flat plates 29a are disposed across long sides at regular intervals, being parallel to a short side direction and linking the long sides. The steel rods 29b are disposed over an upper surface of the lid at regular intervals, being parallel to the long side direction and linking the short sides. In this way, the grating lid 5 has a grating structure in which multiple gratings 29 are formed.

Figure 3:
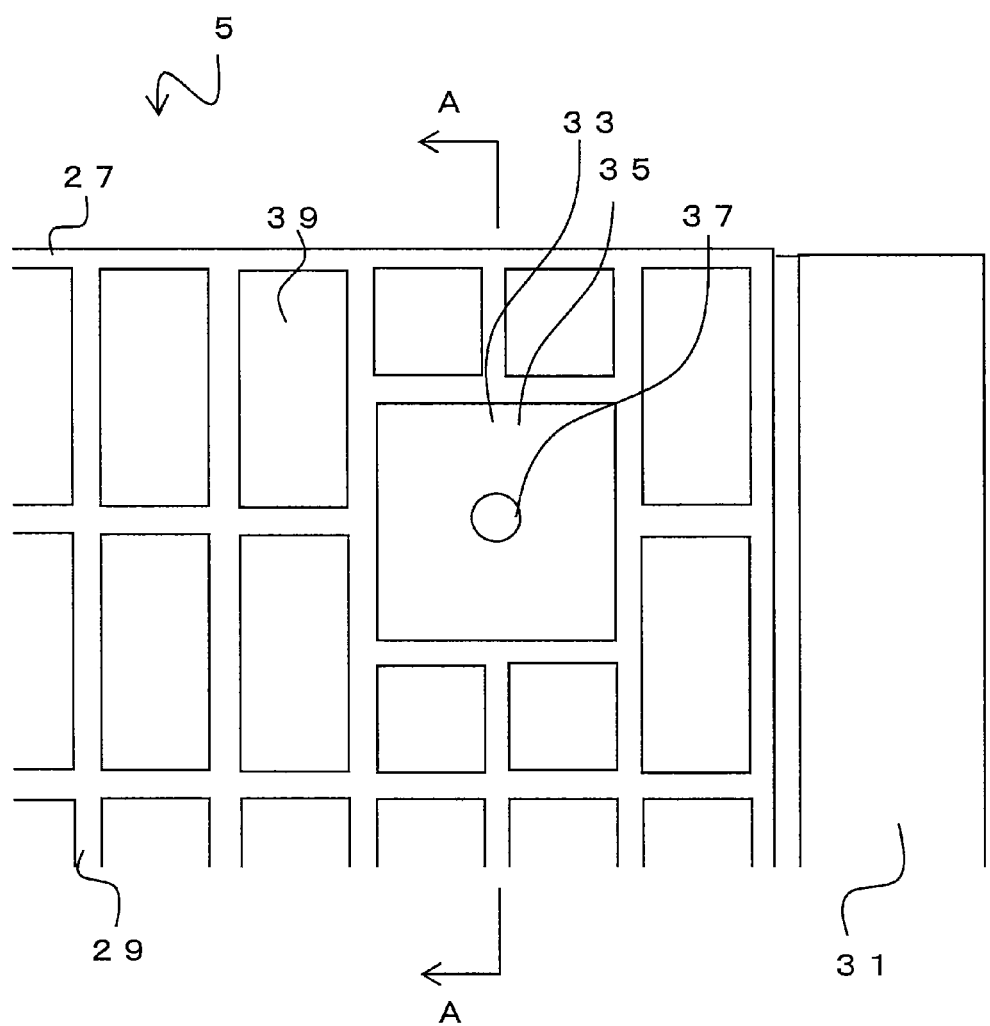
FIG. 3A is an enlarged plan view of proximity of a bolt fixing section 33 of the grating lid 5.
FIG. 3B is a cross-sectional view taken along A-A line in FIG. 3A.
Figure 3:
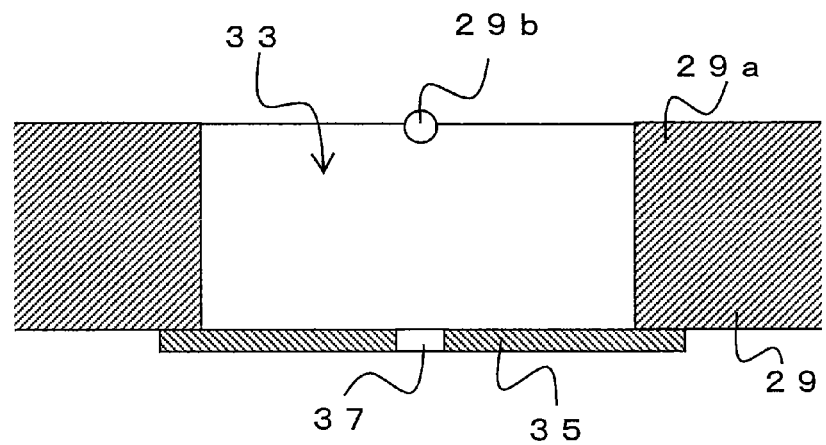

FIG. 3A shows a bolt fixing section of the grating lid 5. A bolt fixing section 33 of the grating lid 5 is formed at each of proximity of a front end and proximity of a back end of the gratings 29. FIG. 3A is an enlarged plan view in proximity of the bolt fixing section 33, and FIG. 3B is a cross-sectional view taken along A-A line in FIG. 3A.

The bolt fixing section 33 is formed by welding to the gratings 29 a steel plate with mounting hole 35 formed with a mounting hole 37. The bolt fixing sections 33 are formed at two predetermined positions at the front and back ends of the grating lid 5, respectively, in which the positions are substantially symmetric in a width direction of the grating lid 5 and do not interfere with the gratings 29.

In more detail, a part of the gratings 29 of the grating lid 5 is notched at the predetermined position at each of the proximity of the front end and the proximity of the back end of the gratings 29 of the grating lid 5, and the steel plate with mounting hole 35 formed with the mounting hole 37 is welded to the notched part in the gratings 29 so as to form the bolt fixing section 33 of the grating lid 5. The arrangement, shape, and size of the gratings 29 and the steel plate with mounting hole 35 are not limited to those shown in the illustrated examples.

A steel-made L-shape flange member 31, which is bent into an L shape, is welded to an outer surface of one of short sides of the frame body 27 of the grating lid 5. The L-shape flange member 31 is fixed forming a tongue-shaped projection that has a length equivalent to a connected part between the trough bodies 3. For example, the L-shape flange member 31 is formed by welding along an outer surface of an end part of a longitudinal direction of the grating lid 5, in which the steel plate having a cross-sectional size of 45 mm wide, 25 mm high, and 3.2 mm thick is welded over a length of 220 mm. A function of the L-shape flange member 31 will be described below.

Figure 4:
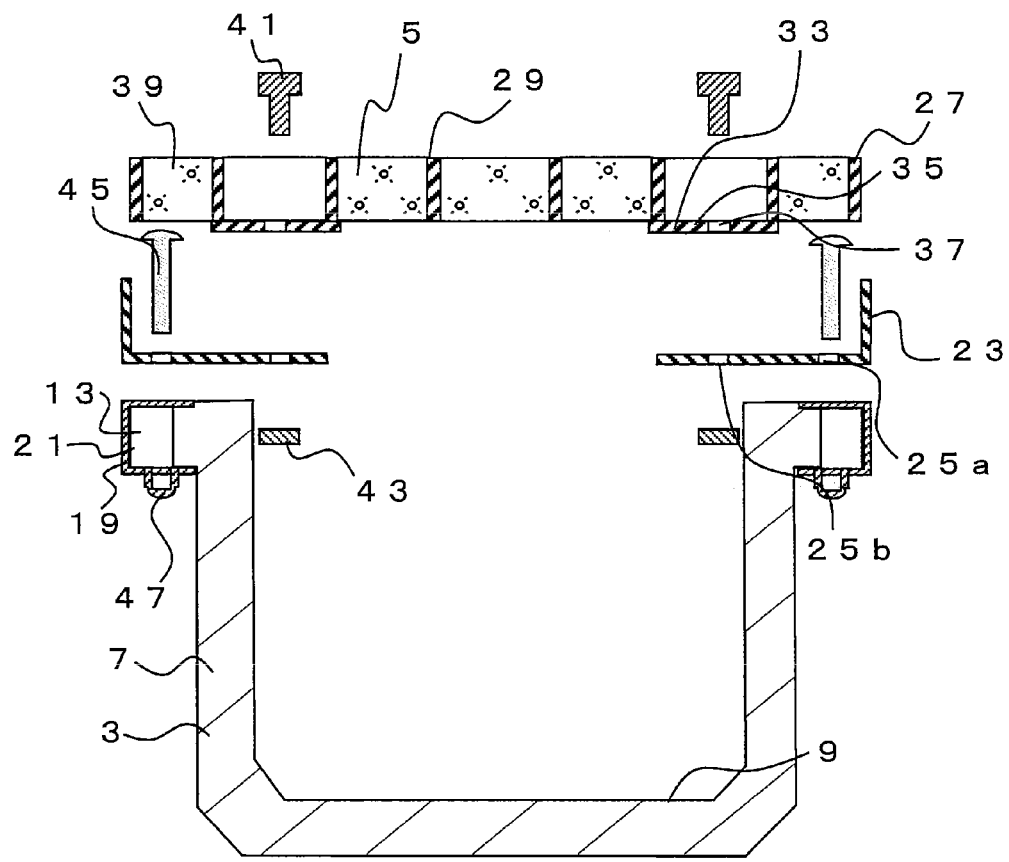
FIG. 4A is a view showing an attachment process of the grating lid onto the trough body.
FIG. 4B is a view showing the attachment process of the grating lid onto the trough body.
Figure 4:
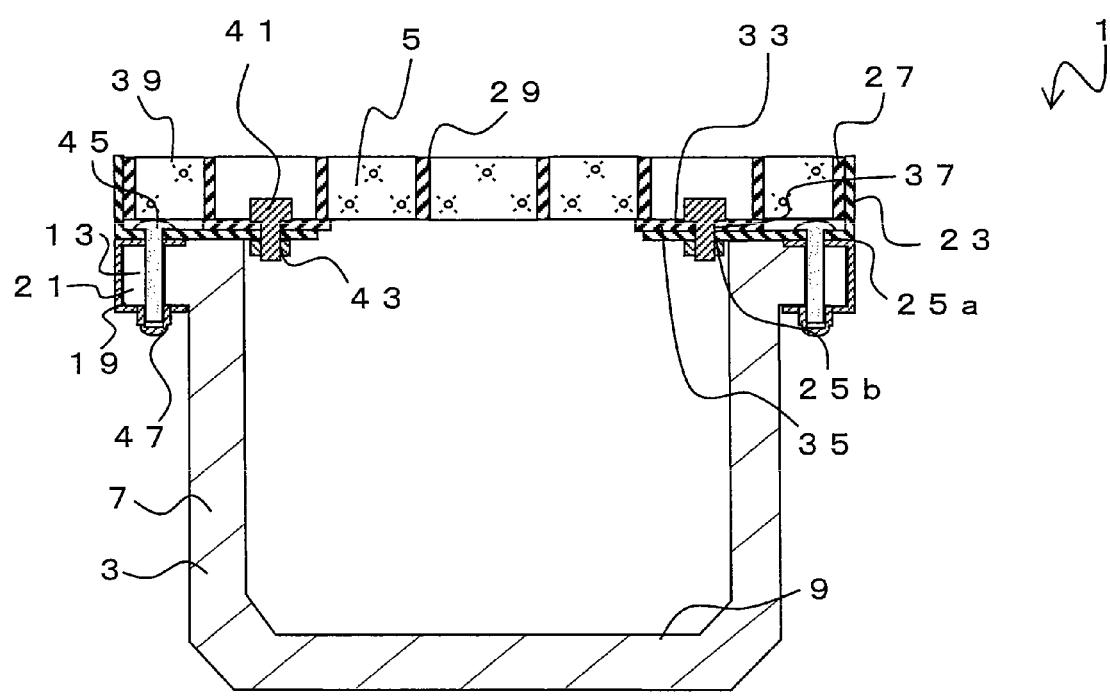
Figure 5:
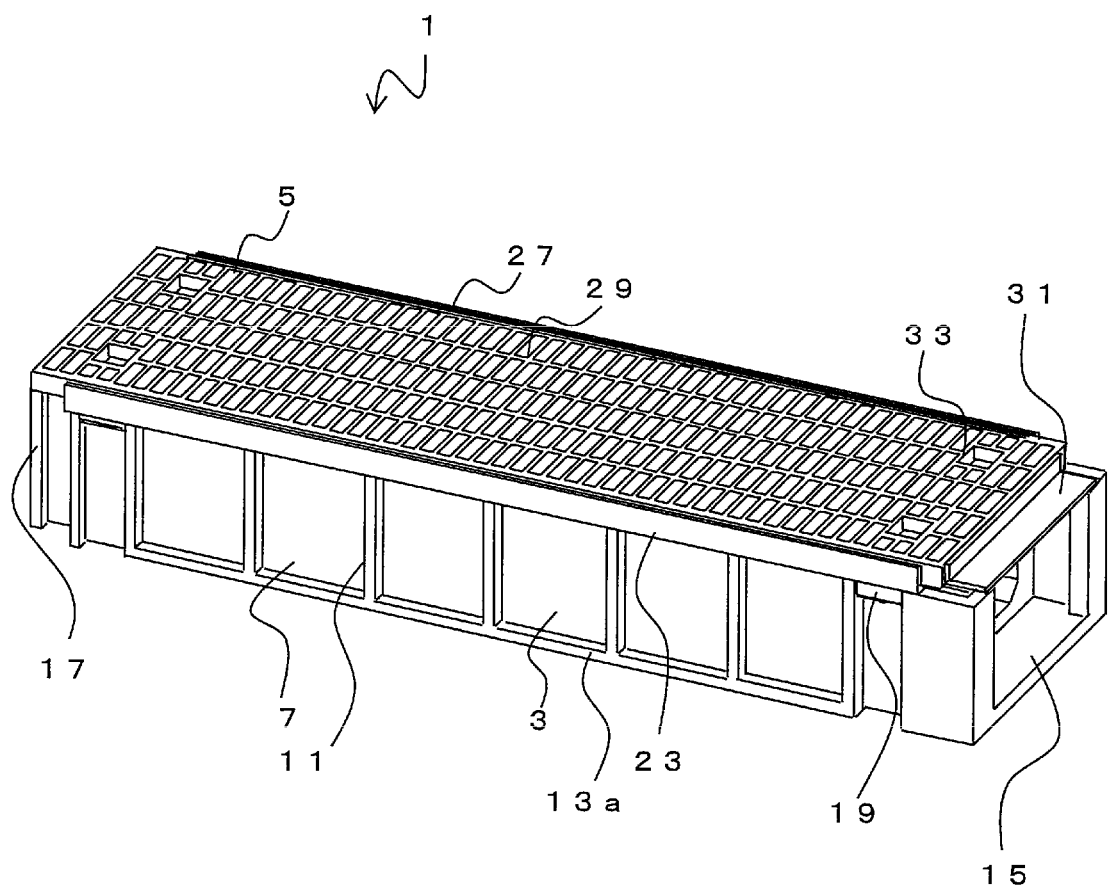
FIG. 5 is an assembled perspective view showing the structure 1 for attaching the grating lid onto the trough body.

FIG. 4A and FIG. 4B are views showing processes of attaching the grating lid 5 onto the trough body 3, and FIG. 5 is an assembled perspective view showing the structure 1 for attaching the grating lid onto the trough body. The steel-made L-shape member 23 having an L-shape cross section is disposed via a metallic fixing member 19 to the mounting portion 21 for metallic fixing members of the horizontal rib 13. A pair of the L-shape members 23 are disposed so that horizontal surfaces of the L-shape members 23 face the horizontal ribs 13 and cover top parts of the side sections 7 of the trough body 3.

Also, as mentioned above, the metallic fixing member 19 having a U-shaped cross section is provided on the mounting portion 21 for metallic fixing members of the horizontal rib 13. A bolt 45 is inserted into a mounting hole 25a of the L-shape member 23. A nut 47 is fixed to a lower part of the metallic fixing member 19 by welding or caulking. The nut 47 and the bolt 45 for attachment fix the metallic fixing member 19 with the L-shape member 23.

The nut 47 that is to be provided at the lower part of the metallic fixing member 19 may be a cap nut. Also, an attachment bolt may be welded to the lower part of the metallic fixing member 19 in place of the nut 47. When the cap nut is disposed, the cap nut is fixed from above with the bolt 45; and when the attachment bolt is welded, the attachment bolt is fixed from above with a nut.

With the L-shape member 23 being attached via the metallic fixing member 19 to the mounting portion 21 for metallic fixing members (the horizontal rib 13) of the trough body 3, the mounting hole 25b provided on the L-shape member 23 is positioned on an inner side of the cross section of the trough body 3 with respect to tip end parts (the top parts) of both the side sections 7 of the trough body 3. The other mounting hole 25b provided on the L-shape member 23 and the mounting hole 37 of the steel plate 35 with mounting hole of the grating lid 5, which is formed by notching a part of the gratings 29 at positions that are symmetric with regard to the short side of the grating lid 5 and by welding the steel plate 35 with mounting hole to a back surface of the notched part of the gratings 29, are disposed so that positions of the holes match one another. Here, the L-shape member is formed to have a length of approximately 1 m, a width of 62.5 mm, a height of 34.5 mm, and a steel thickness of 4.5 mm, for example.

A bolt 41 is inserted into the mounting hole 25b of the L-shape member 23 and the mounting hole 37 of the grating lid 5 and fixed with a nut 43. By fixing the steel plate 35 with mounting hole to the L-shape member 23 and by fixing the grating lid 5 to the L-shape member 23 as above, the grating lid 5 can be attached onto the trough body 3 with the bolt via the L-shape member 23.

As above, an accommodation space for accommodating the grating lid 5 is formed by the pair of L-shape members 23 being fixed with the bolts to the metallic fixing members 19 attached to the horizontal ribs 13. The grating lid 5 is accommodated in the accommodation space, and the grating lid 5 is fixed to a bolt fixing section, which is the mounting hole 25b formed in the horizontal surfaces of the L-shape members 23. This allows the grating lid 5 to be fixed to the trough body 3 via the L-shape members 23 with bolts. Here, the grating lid 5 is fixed to the side sections 7 of the trough body 3 not directly but via the L-shape members 23. Such the two-staged fixing of the grating lid 5 can actually avoid having a complex fixing structure, which is to be expected if the grating lid 5 is directly fixed to the side sections 7.

Figure 6:
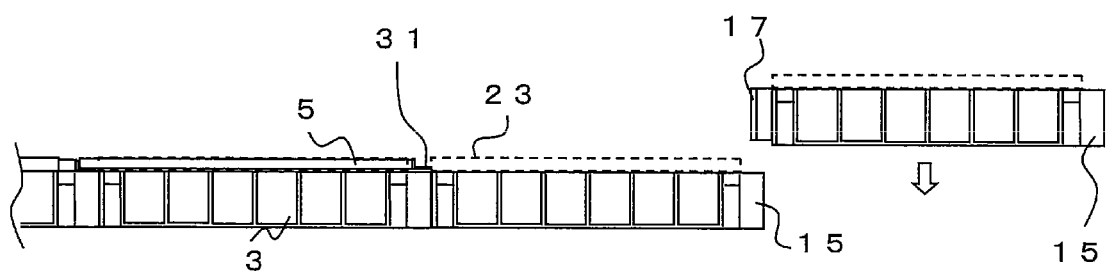
FIG. 6A is a view showing a method for forming a trough track 50.
FIG. 6B is a view showing the method for forming the trough track 50.
FIG. 6C is a view showing the method for forming the trough track 50.
Figure 6:
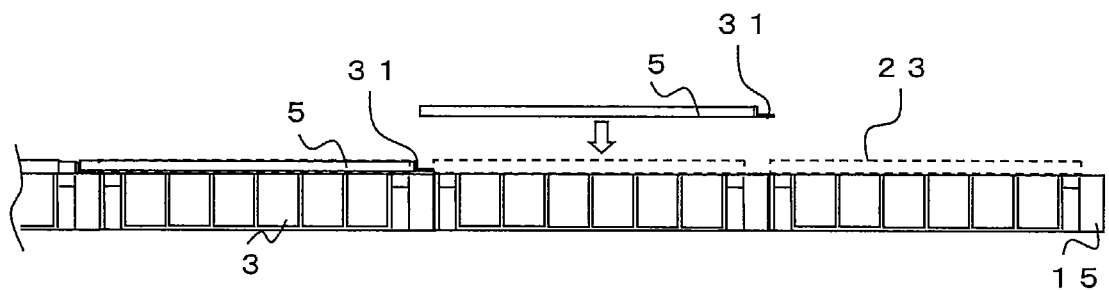
Figure 6:
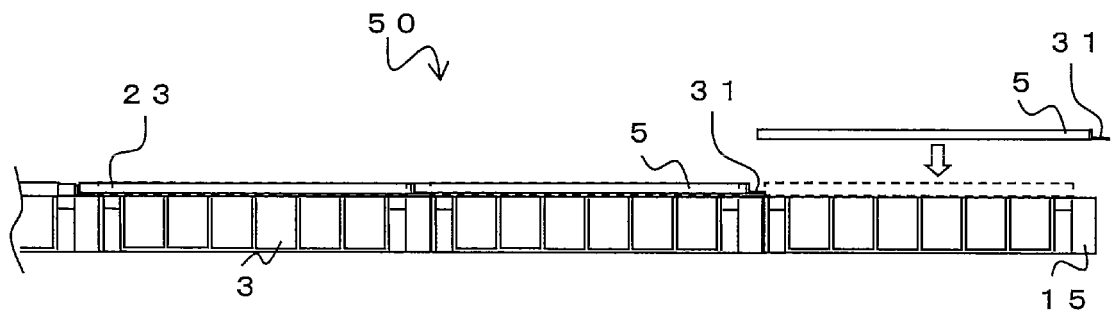
Figure 7:
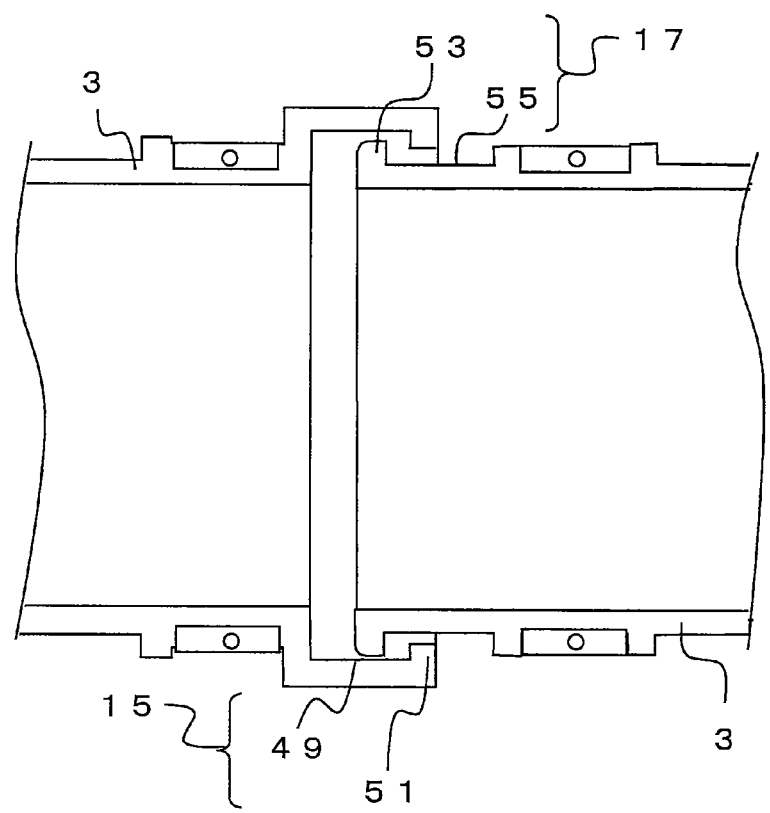
FIG. 7A is an enlarged view of proximity of fitting portions between the trough bodies 3, showing a straight part.
FIG. 7B is an enlarged view of proximity of the fitting portions between the trough bodies 3, showing a curved part.
Figure 7:
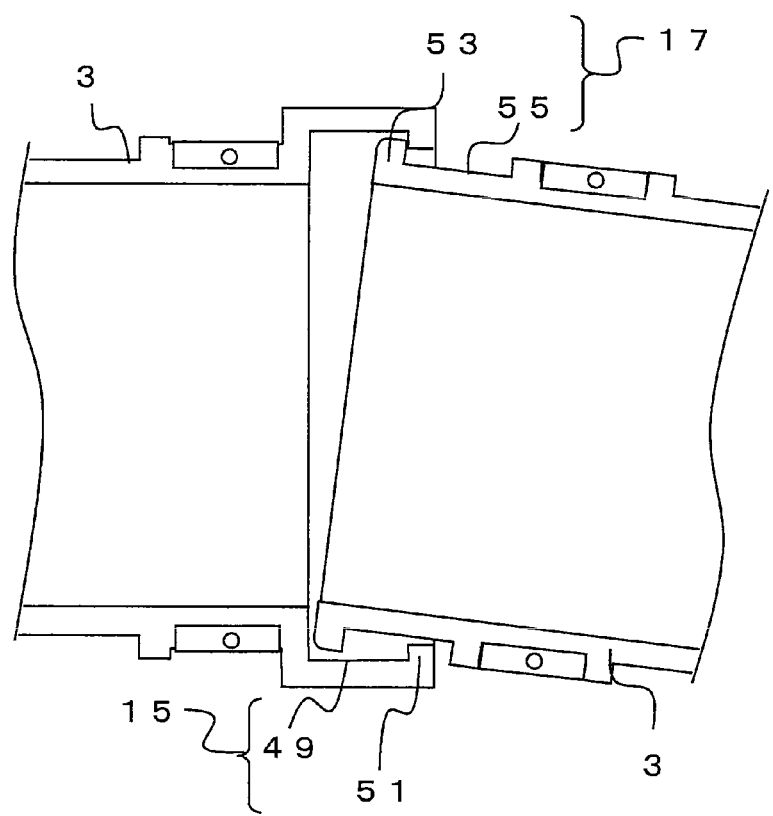

Next, a trough track forming method using the structure 1 for attaching the grating lid onto the trough body will be described. FIG. 6A to FIG. 6C are drawings to show a method for forming a trough track 50. FIG. 6A is a view showing a state in which the trough body 3 is newly connected to a right side of the trough body 3 that has been previously installed on a left side. Also, FIG. 7A is a plan view showing a state in which the male fitting portion 17 and the female fitting portion 15 of the adjacent trough bodies 3 are fitted with each other (illustrations of L-shape members 23 etc. are omitted). The trough track 50 includes the structure 1 for attaching the grating lid onto the trough body and is formed by repeatedly interconnecting together pluralities of the trough bodies 3 and the grating lids 5.

As mentioned above, the female fitting portion 15 and the male fitting portion 17 are provided on either side of the longitudinal direction of the trough body 3. As shown in FIG. 7A, the male fitting portion 17 has a reduced diameter portion 55, in which a cross section thereof has a reduced diameter, and an enlarged diameter portion 53, which is formed at a tip end of the reduced diameter portion 55 where the cross section is bent outward. Also, the female fitting portion 15 has an enlarged diameter portion 49, in which a cross section thereof has an enlarged diameter for accommodating the male fitting portion 17, and a reduced diameter portion 51, which is formed at a tip end of the enlarged diameter portion 49 where the diameter of the cross section is reduced.

To form the trough track, firstly, the enlarged diameter portion 53 of the male fitting portion 17 of the first trough body 3 is inserted from above into the enlarged diameter portion 49 of the female fitting portion 15 of the second trough body 3 so as to engage both the fitting portions to link the trough bodies 3 together. At this time, there is clearance between the male fitting portion 17 and the female fitting portion 15 both in a width direction and in a longitudinal direction. Thus, as shown in FIG. 7B, the trough bodies 3 can be connected being curved. Thus, at least a part of the trough track 50 may be formed with a curved part.

Next, as shown in FIG. 6B and FIG. 6C, the grating lid 5 is installed above the trough body 3. At this time, the grating lid 5 is installed by mounting an end part (the end part on a side where the L-shape flange member 31 is not disposed) of the grating lid 5 that is to be newly installed onto the L-shape flange member 31 of the grating lid 5 that has been previously installed.

Figure 8:
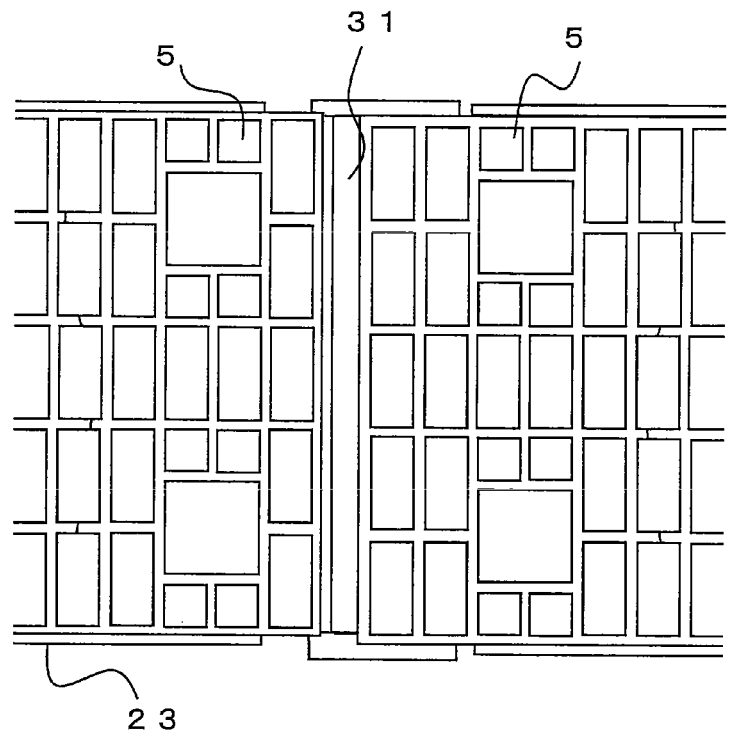
FIG. 8A is an enlarged view of proximity of a connected part between the grating lids 5, showing a straight part.
FIG. 8B is an enlarged view of proximity of the connected part between the grating lids 5, showing a curved part.
Figure 8:
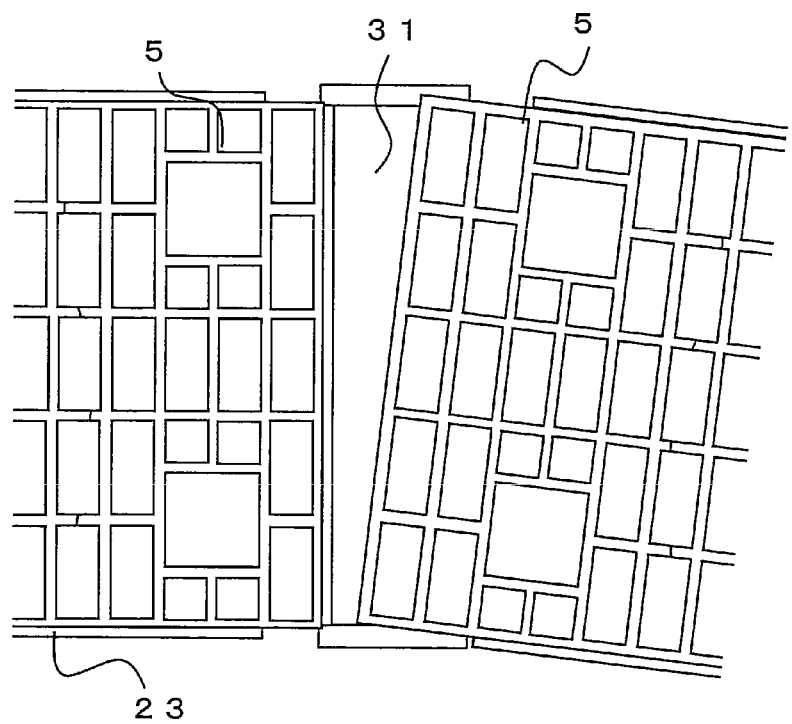

FIG. 8A is an enlarged plan view of proximity of the interconnected part between the grating lids 5, showing a state in which the grating lids 5 are mounted onto the trough bodies 3 shown in FIG. 7A. As mentioned above, the L-shape flange member 31 is welded to the grating lid 5 forming the tongue-shaped projection that has a length equivalent to the interconnected part between the trough bodies 3 (e.g., a length of the female fitting portion 15). Thus, when the grating lids 5 are mounted on the trough bodies 3, the L-shape flange member 31 is disposed above the interconnected part between the trough bodies 3 (a fitted portion between the male fitting portion 17 and the female fitting portion 15). This can prevent entry of foreign materials or the like into the trough bodies 3 even if there is a gap created between the grating lids 5.

FIG. 8B is an enlarged plan view of the proximity of the interconnected part between the grating lids 5, showing a state in which the grating lids 5 are mounted onto the trough bodies 3 shown in FIG. 7B. As shown in the drawing, the grating lids 5 are interconnected together with an angle at the curved part of the trough track, and the L-shape flange member 31 prevents a gap from being formed.

As above, the male fitting portion 17 of the first trough body 3 is fitted with the female fitting portion 15 of the adjacent second trough body 3 so that the trough bodies 3 can be interconnected together. Furthermore, the two grating lids 5 are used and one of the grating lids 5 is mounted on the L-shape flange member 31 of the other grating lid 5 so that the grating lids 5 can be interconnected together. Moreover, by interconnecting the male fitting portion 17 and the female fitting portion 15 of the trough bodies 3, the trough track 50 in which pluralities of the trough bodies 3 and the grating lids 5 are repeatedly interconnected together can be formed.

Here, the male fitting portion 17 of the trough body 3 and the L-shape flange member 31 of the grating lid 5 are disposed so that a direction of the male fitting portion 17 of the trough body 3 is opposite to a direction of the L-shape flange member 31 of the grating lid 5. In the example shown in FIG. 6A to FIG. 6C, the male fitting portion 17 of the trough body 3 is disposed directing toward left in the drawing, and the L-shape flange member 31 of the grating lid 5 is disposed directing toward the right side of the drawing.

As mentioned above, the trough bodies 3 are fitted with each other by inserting the male fitting portion 17 into the female fitting portion 15 from above. Thus, in the illustrated example, the trough bodies 3 are disposed in turn in a direction in which the female fitting portions 15 are disposed (from the left side to the right side in the drawing). On the other hand, for the grating lids 5, the grating lid 5 to be installed next is mounted onto the upper part of the previously installed L-shape flange member 31. Thus, the grating lids 5 are disposed in turn in a direction in which the L-shape flange members 31 are disposed (from the left side to the right side in the drawing).

Thus, in a case of forming a trough track by interconnecting one hundred troughs, for example, if the direction of the male fitting portions 17 of the trough bodies 3 matches the direction of the L-shape flange members 31 of the grating lids 5, it is necessary to dispose the grating lids 5 after all of the one hundred trough bodies 3 are arranged, by placing the grating lid 5 on the trough body 3 which was placed last of all and then disposing the grating lids 5 in turn. By contrast, if the direction of the male fitting portions 17 of the trough bodies 3 is opposite to the direction of the L-shape flange members 31 of the grating lids 5, an installation direction of the trough bodies 3 and an installation direction of the grating lids 5 are the same, and thus the trough bodies 3 and the grating lids 5 can be constructed simultaneously.

Also, the L-shape flange member 31 of each of the grating lids 5 except for the one at the end of the trough track 50 has the adjacent grating lid 5 mounted thereon, and, thus, it is difficult to remove the grating lids 5 with ease. This can suppress the grating lids 5 from being opened, and, as a result, theft of inside cables etc. can be prevented.

Figure 9:
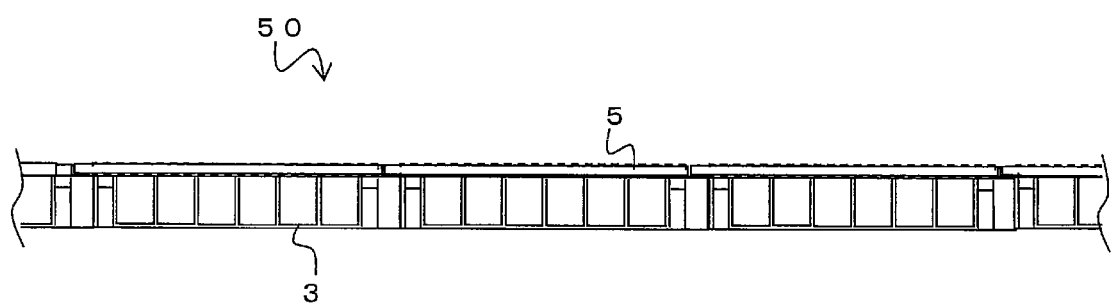
FIG. 9A is a view showing a maintenance method of the trough track 50.
FIG. 9B is a view showing the maintenance method of the trough track 50.
Figure 9:
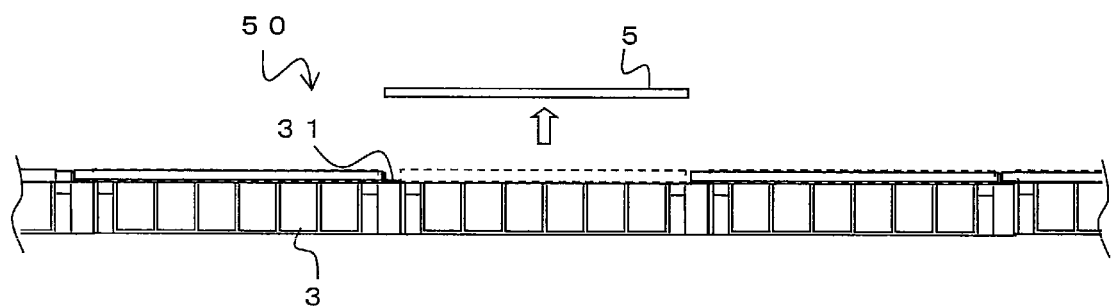

Note here that the grating lids 5 without the L-shape flange members 31 may be placed at regular intervals on a part of the straight part of the trough track 50. In FIG. 9A, the grating lid 5 in the middle does not have the L-shape flange member 31. In this way, as shown in FIG. 9B, such the grating lid 5 can be easily opened up separately. Thus, it is easy to perform maintenance works and the like inside the trough bodies 3.

As described above, according to the embodiments of the present invention, the grating lids 5 can be attached onto the upper parts of the resin-made trough bodies 3, and thus the required load bearing capacity can be achieved. At this time, the L-shape members 23 are attached to the horizontal ribs 13 on the outer surfaces of the side sections 7 of the trough body 3, and thus the rib structure of the trough body 3, including the horizontal ribs 13 and vertical ribs 11, can receive the horizontal load applied by vehicles travelling over the grating lid 5. Also, the upper ends of the side sections 7 of the trough body 3 can directly receive vertical load. Thus, a pressure receiving part for the vehicle load can be distributed to the rib structure and the side sections.

The horizontal ribs 13 receive horizontal load, and the load received by the horizontal rib 13 is distributed to the vertical ribs 11 on both sides of the horizontal rib 13 as the horizontal load. Also, since the trough bodies 3 are used being buried underground, the horizontal load received by the trough bodies 3 is distributed to the earth on both sides of the trough bodies 3. Here, the vertical ribs 11 receive the vertical load. That is, not only the vertical ribs 11 interposing the horizontal ribs 13 but also the five vertical ribs 11 between the vertical ribs 11 at the front and back ends of the trough body 3 receive the vertical load. As above, the horizontal rib 13 has two roles: one as a mounting portion for the L-shape member 23 and another as a reinforcing structure. Furthermore, the side sections 7 of the trough body 3 are reinforced by the vertical ribs 11 and thus do not buckle.

Also, the L-shape members 23 are not directly attached to the side sections 7 of the trough body 3, and this can eliminate a need of processing the side sections 7 of the trough body 3. Thus, there is no need to machine process the trough body 3, which can suppress stress concentration due to machine processing and cracking of the trough body 3. This can improve the load bearing capacity of the trough body 3.

Also, instead of attaching the grating lid 5 directly to the trough body 3, the L-shape members 23 as a supporting member are attached, and attaching portions for the L-shape members 23 are provided separately from attaching portions for the grating lid 5. Thus, the L-shape members 23 and the grating lid 5 can be individually attached in simple structures.

Also, connecting the L-shape flange member 31 to the grating lid 5 can get rid of a gap created between the grating lids 5. Also, disposing the grating lid 5 onto the adjacent L-shape flange member 31 can prevent the grating lid 5 to be easily opened up. Also, at the same time, since the grating lids 5 can block up the upper parts of the trough bodies 3, sealing performance of the trough track can be improved, which can improve security performance such as prevention of the cables disposed inside the trough bodies 3 from damages, fire, and theft.

Figure 10:
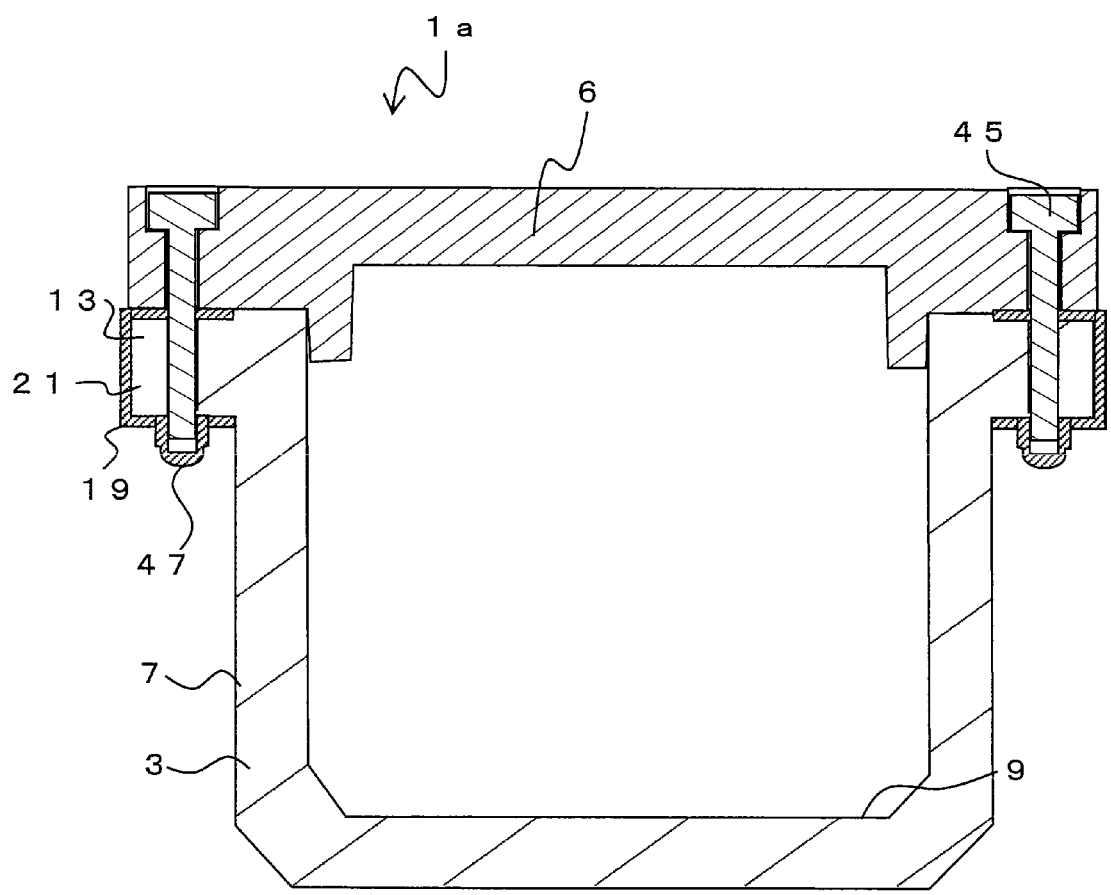
FIG. 10 is a view showing a structure 1*a* for attaching a resin-made trough lid 6 onto the trough body.

Note that, instead of attaching the L-shape members 23 for accommodating the grating lid 5, a resin-made trough lid may be fixed directly to the mounting portions 21 for metallic fixing members of the horizontal ribs 13. FIG. 10 is a cross-sectional view showing a structure 1a for attaching a grating lid onto a trough body. For example, Specification for Highway Bridges (issued by Japan Road Association) and Cabinet Order on Vehicle Restriction defines that the strength classification of T-25 should bear a total vehicle weight of 25 t, the maximum wheel load of 50 kN, an impact factor of 0.4 (a live load of 70 kN), and a tire contact area of 200 mm by 500 mm.

Such the load bearing capacity is required only at a part of the trough track sections. Thus, the grating lids 5 may be fixed at such the section where the load bearing capacity is required, and conventional resin-made trough lids 6 may be used at the other sections where the load bearing capacity is not required.

As above, at a part of the trough track 50, instead of attaching the grating lids 5, the plurality of resin-made trough lids 6 are continuously connected and directly fixed to the mounting portions 21 for metallic fixing members of the horizontal ribs 13 so that the trough track covered with the grating lids 5 and the trough track covered with the resin-made trough lids 6 can be continuously formed. As a result, the trough track including sections with different appropriate load bearing capacity can be obtained. At this time, the resin-made trough lid 6 is not required to have the exceptional load bearing capacity, and thus the thickness of the resin-mad trough lid 6 can be approximately the same as the thickness of the grating lid 5. This can ensure safety of pedestrians walking over the trough lids.

Figure 11:
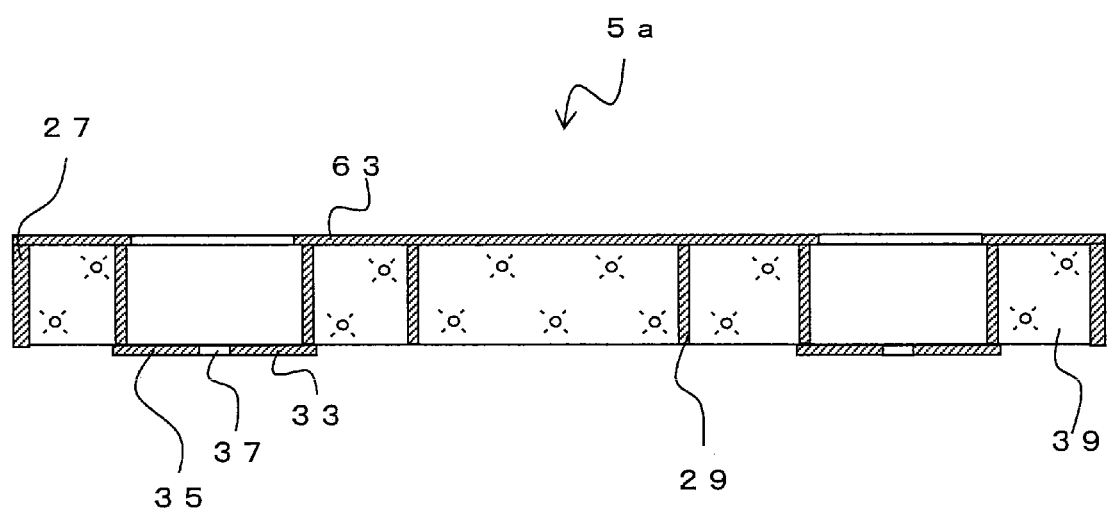
FIG. 11 is a cross-sectional view showing a grating lid 5*a*.

Also, as a substitute for the grating lid 5, a grating lid 5a shown in FIG. 11 may be used. The grating lid 5a has approximately the same structure as the grating lid 5 except that a steel plate 63 is welded on an upper surface of the grating lid 5. A surface of the steel plate 63 is formed with pear-skin finish (nashiji finish) or provided with nonslip processing.

The steel plate 63 is welded to the frame body 27, for example, and a hole is formed at a part corresponding to the bolt fixing section 33. Providing the steel plate having the pear-skin finished or nonslip processed surface as above can prevent the pedestrians walking over the trough track from slipping.

Figure 12:
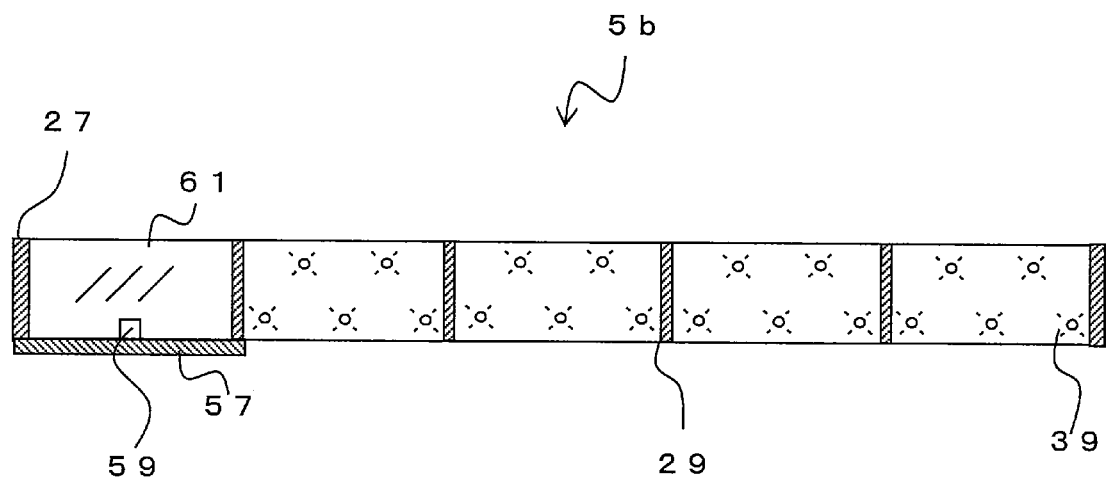
FIG. 12 is a cross-sectional view showing a grating lid 5*b*.

Also, as a substitute for the grating lid 5, a grating lid 5b shown in FIG. 12 may be used. The grating lid 5b has approximately the same structure as the grating lid 5 except that an LED light source 59 is disposed at a part of the grating lid 5.

A substrate 57 is disposed on a part of a back surface of the grating lid 5b. The LED light source 59 is mounted on the substrate 57. The LED light source 59 is disposed inside at least a part of the gratings 29. Also, the LED light source 59 is fixed with epoxy resin 61 that is filled inside the gratings 29. The epoxy resin may be substituted by urethane resin.

The LED light source 59 is disposed at proximity of one end of a width direction of the grating lid 5b. Also, the plurality of LED light sources 59 are disposed at different positions within a predetermined length range along a longitudinal direction of the grating lid 5b, avoiding the bolt fixing sections 33.

As above, by disposing the LED light sources 59 at some parts of the grating lid 5b, the trough track 50 can have decorations. Note that the grating lids 5, 5a, and 5b may be used accordingly at different parts of the same trough track 50.

WORKING EXAMPLE

The load bearing capacity of the above-mentioned structure for attaching a grating lid onto a trough body using a steel material having an L-shape cross section are evaluated. The grating lid used is 32 mm thick, weighs 32 kg/m (covered entirely with a decorative lid containing aggregate), and is classified as T-25 in the strength design classification. As a comparison, a reinforced concrete lid that is 70 mm thick, weighs 48 kg/m, and is classified as T-25 in the strength design classification is used. The L-shape member made of materials other than steel, such as aluminum, may not have enough strength. In addition, if the grating lid body and the L-shape member are made of different metals, a problem of electrochemical corrosion may arise. Thus, it is required that the L-shape member is made of steel.

Figure 13:
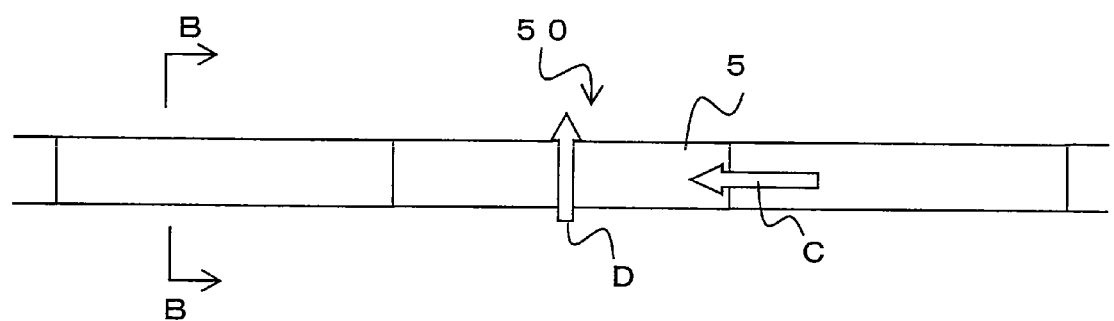
FIG. 13A is a view showing a method for testing the structure for attaching the grating lid onto the trough body.
FIG. 13B is a cross-sectional view taken along B-B line in FIG. 13A.
Figure 13:
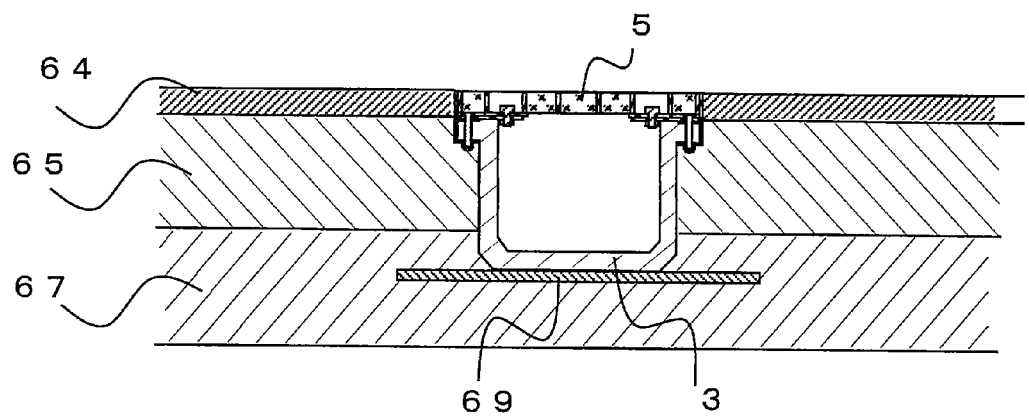

FIG. 13A is a view showing a method for evaluating the load bearing capacity of the structure for attaching the grating lid onto the trough body, and FIG. 13B is a cross-sectional view taken along B-B line in FIG. 13A. The trough track is buried into the ground in a straight line. The grating lid 5 has an outer width of 280 mm and an inner width of 200 mm, and a total height of the trough body 3 and the grating lid 5 is 306 mm. The ground is formed of, in order from the surface, asphalt 64 (50 mm thick), soil 65 (201 mm thick), and broken stones 67 (175 mm thick), and bedding mortar 69 (20 mm thick and 480 mm wide) is disposed underneath the trough body 3.

Figure 14:
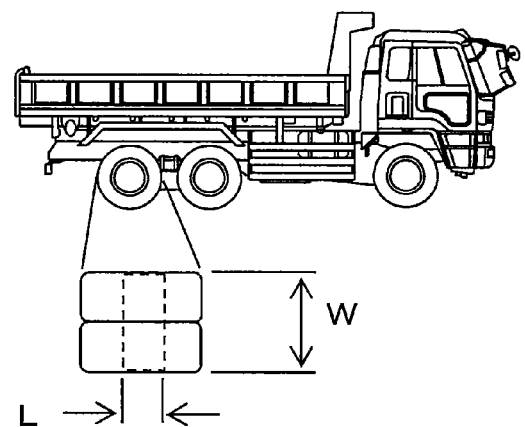
FIG. 14A is a view showing a contact area of a tire.
FIG. 14B is a view showing loads when a vehicle travels in C direction in FIG. 13A.
FIG. 14C is a view showing a load when a vehicle travels in D direction in FIG. 13A.
Figure 14:
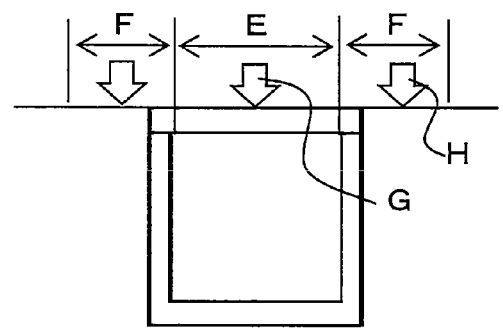
Figure 14:
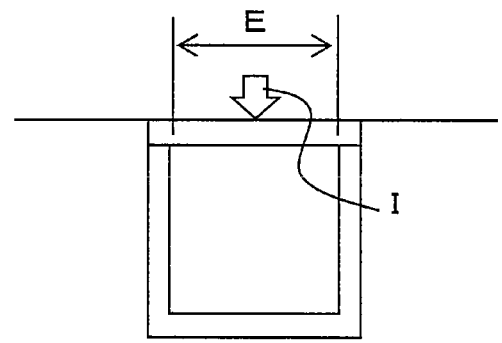

A vehicle used for the test has two front wheels with one axis and four rear wheels with two axes, and weighs 24.97 t in total. FIG. 14A is a view showing a contact area of the rear tires, which is 500 mm wide by 200 mm long. The maximum load for one wheel is set to be 50 kN.

FIG. 14B is a view showing loads when the vehicle travels in C direction in FIG. 13A, and FIG. 14C is a view showing a load when the vehicle travels in D direction in FIG. 13A.

As shown in FIG. 14B, when the vehicle (the tires) travels over the trough track 50 in a longitudinal direction, among the 500 mm width of the installed tires, the upper part of the grating lid that is equivalent to the inner width of the trough body (a section E in the drawing, which is 200 mm wide) receives a load of 28 kN (G in the drawing), and each side of the section E (sections F in the drawing, each having a 150 mm width) receives a load of 21 kN. On the other hand, when the vehicle (the tires) travels across the trough track 50, the upper part of the grating lid that is equivalent to the inner width of the trough body (the section E in the drawing, which is 200 mm wide) bears the 200 mm length of the installed tires, receiving a load of 70 kN. Thus, the evaluation is carried out using the conditions for the crossing vehicle (the D direction in FIG. 13A), which are more severe.

Figure 15:
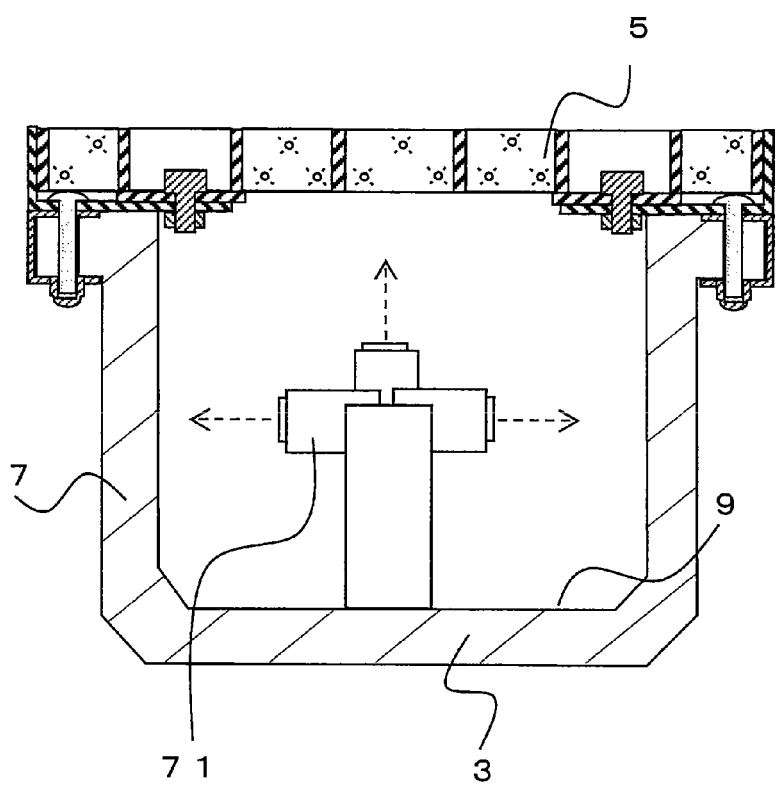
FIG. 15 is a view showing a method for measuring displacement of the trough body 3 and the grating lid 5.

As shown in FIG. 15, a laser displacement instrument 71, facing both inner faces of the side sections 7 and a lower face of the grating lid 5, is disposed inside the trough body 3. In such the state, the vehicle travels across over the said part and displacement of each part at the time is measured.

As a result, in a case of the reinforcement concrete lid, a position of the lower face of the trough lid is lowered 1.7 mm at most when the vehicle travels. Note that this displacement is total deformation of the trough body and the trough lid. No damage was seen in the trough lid after passing of the vehicle.

The same evaluation was performed on a case using the grating lid 5, and the displacement of the lower face position of the grating lid 5 after passing of the vehicle is 1.6 mm at most, and no damage was seen in the grating lid 5 after passing of the vehicle. As above, it was found that the grating lid 5 has the same load bearing capacity as the reinforced concrete lid.

Also, with the trough body 3 and the grating lid 5 being fixed, different loads of 0 to 50 kN are applied repeatedly onto the upper surface of the grating lid 5, and no damage was found after 100,000 times of repeated loading.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. A structure for attaching a grating lid onto a trough body that is made of resin, the trough body comprising:

a substantially U-shaped cross section having a bottom section and two side sections, wherein vertical ribs for reinforcement are formed at regular intervals on outer faces of both side sections of the trough body having a predetermined length;

the two vertical ribs are formed in proximities of each of front and back ends of the trough body and a horizontal rib for attaching an L-shape member is formed at the proximities of each of the front and back ends of the trough body so as to link the two vertical ribs;

the predetermined number of the vertical ribs are disposed at regular intervals between the vertical rib at the front end and the vertical rib at the back end of the trough body, and another horizontal rib is further formed at a bottom part of the side section of the trough body so as to link the vertical ribs;

L-shape members are disposed such that a horizontal surface of a steel material having an L-shape cross section of each of the L-shape members faces a metallic fixing member of the horizontal rib, the L-shape members covering top parts of the side sections of the trough body;

an accommodation space for accommodating the grating lid is formed by the L-shape members being fixed with bolts to the metallic fixing members attached to the horizontal ribs, and the grating lid is accommodated in the accommodation space; and the grating lid is fixed to bolt fixing sections, which are mounting holes formed in the horizontal surfaces of the L-shape members.

2. The structure for attaching the grating lid onto the trough body according to claim 1, the grating lid comprising:

a grating structure comprising a substantially rectangular frame body and multiple gratings that are formed inside the frame body, the gratings are formed of multiple flat steel plates and steel rods, the flat steel plates being disposed across long sides at regular intervals, being parallel to a short side direction and linking the long sides, and the steel rods being disposed over an upper surface of the lid at regular intervals, being parallel to a long side direction and linking the short sides;

the bolt fixing sections are formed at two predetermined positions at proximities of each of the front and back ends of the grating lid, wherein the positions are substantially symmetric in a width direction of the grating lid and do not interfere with the gratings, each of the bolt fixing sections being formed by welding to the positions a steel plate with a mounting hole formed with a mounting hole; and an L-shape flange member that is bent into an L shape is welded to an outer surface of one short side of the frame body of the grating lid, the L-shape flange member being fixed forming a tongue-shaped projection that has a length equivalent to a connected part between the trough bodies.

3. The structure for attaching the grating lid onto the trough body according to claim 2, wherein the grating lid is attached onto the trough body via the L-shape member by providing the metallic fixing member having a U-shaped cross section at the mounting portion for metallic fixing members of the horizontal rib, fixing the metallic fixing member and the L-shape member with a nut and a bolt for attachment, and fixing the grating lid to the L-shape member.

4. The structure for attaching the grating lid onto the trough body according to claim 3, wherein with the L-shape member being attached via the metallic fixing member to the mounting portion for metallic fixing members of the trough body, another mounting hole, which is provided on the L-shape member being positioned on an inner side of the cross section of the trough body with respect to tip end parts of the both side sections of the trough body, and the steel plate with mounting hole of the grating lid, which is formed by welding the steel plate with the mounting hole to a back surface of the grating lid, are disposed so that positions of the holes match one another to fix the steel plate with the mounting hole to the L-shape member, thereby fixing the grating lid with bolts onto the trough body.

5. The structure for attaching the grating lid onto the trough body according to claim 4, wherein inner parts of the gratings of the grating lid are filled with either by aggregate including at least one of ceramics and natural stones that is solidified by adhesive resin such as epoxy resin or urethane resin, or by mortar.

6. The structure for attaching the grating lid onto the trough body according to claim 1, wherein instead of attaching the L-shape members for accommodating the grating lid, a resin-made trough lid can be fixed directly to the mounting portions for metallic fixing members of the horizontal ribs.

7. A structure for attaching a grating lid onto a trough body that is made of resin, the trough body comprising:

a substantially U-shaped cross section having a bottom section and two side sections, wherein the trough body having a predetermined length is provided with a male fitting portion on one end and a female fitting portion on the other end, the male fitting portion and the female fitting portion being able to be fitted with each other;

the male fitting portion has a reduced diameter portion at which a cross section of the male fitting portion has a reduced diameter, and an enlarged diameter portion being formed at a tip end of the reduced diameter portion where the cross section is bent outward;

the female fitting portion has an enlarged diameter portion at which a cross section of the female fitting portion has an enlarged diameter for accommodating the male fitting portion, and a reduced diameter portion being formed at a tip end of the enlarged diameter portion where the diameter of the cross section is reduced;

vertical ribs for reinforcement are formed at regular intervals on outer faces of both side sections of the trough body having the predetermined length;

the two vertical ribs are formed in proximities of each of front and back ends of the trough body and a horizontal rib for attaching an L-shape member is formed at the proximities of each of the front and back ends of the trough body so as to link the two vertical ribs;

the predetermined number of the vertical ribs are disposed at regular intervals between the vertical rib at the front end and the vertical rib at the back end of the trough body, and another horizontal rib is further formed at a bottom part of the side section of the trough body so as to link the vertical ribs;

L-shape members are disposed such that a horizontal surface of a steel material having an L-shape cross section of each of the L-shape members faces a metallic fixing member of the horizontal rib, the L-shape members covering top parts of the side sections of the trough body;

an accommodation space for accommodating the grating lid is formed by the L-shape members being fixed with bolts to the metallic fixing members attached to the horizontal ribs, and the grating lid is accommodated in the accommodation space; and the grating lid is fixed to bolt fixing sections, which are mounting holes formed in the horizontal surfaces of the L-shape members.

8. The structure for attaching the grating lid onto the trough body according to claim 7, the grating lid comprising:
a grating structure comprising a substantially rectangular frame body and multiple gratings that are formed inside the frame body, wherein
the bolt fixing sections are formed at two predetermined positions at the front and back ends of the gratings, respectively, each of the bolt fixing sections being formed by notching a part of the gratings and welding to the notched part a steel plate with a mounting hole formed with a mounting hole; and
an L-shape flange member, which is bent into an L shape, is welded to an outer surface of one short side of the frame body of the grating lid, the L-shape flange member being fixed forming a tongue-shaped projection that has a length equivalent to a connected part between the trough bodies.

9. The structure for attaching the grating lid onto the trough body according to claim 8, wherein the grating lid is attached onto the trough body via the L-shape member by providing the metallic fixing member having a U-shaped cross section at the mounting portion for metallic fixing members of the horizontal rib, fixing the metallic fixing member and the L-shape member with a bolt, and fixing the grating lid to the L-shape member.

10. The structure for attaching the grating lid onto the trough body according to claim 9, wherein a mounting hole, which is provided on the L-shape member being positioned on an inner side of the cross section of the trough body with respect to tip end parts of the both side sections of the trough body, is fixed with bolt to the bolt fixing section of the grating lid, the bolt fixing section being formed by notching a part of the gratings and welding to the notched part the steel plate with the mounting hole, thereby fixing the grating lid with bolts onto the trough body.

11. The structure for attaching the grating lid onto the trough body according to claim 10, wherein a steel plate having a surface provided with pear-skin finish (nashiji finish) or nonslip processing is welded onto an upper surface of the grating lid.

12. A trough track comprising:
the structure for attaching the grating lid onto the trough body according to claim 10,
wherein the trough track is formed by repeatedly interconnecting a large number of the trough bodies and the grating lids, respectively.

13. The trough track according to claim 12, wherein the trough track includes a curved part at least partly.

14. A trough track comprising:
the structure for attaching the grating lid onto the trough body according to claim 12, wherein:
the trough track is formed by repeatedly interconnecting a large number of the trough bodies and the grating lids, respectively; and
the grating lids without L-shape flange members are placed at regular intervals to cover a part of straight sections of the trough track.

15. The trough track according to claim 12, wherein instead of attaching the grating lids, the plurality of resin-made trough lids are continuously connected and directly fixed to the mounting portions for metallic fixing members of the horizontal ribs at a part of the trough track such that the trough track covered with the grating lids and the trough track covered with the resin-made trough lids are continuously formed.

16. A trough track forming method using the structure for attaching the grating lid onto the trough body according to claim 10, the method comprising:
interconnecting together the trough bodies by fitting the male fitting portion of the first trough body with the female fitting portion of the second trough body;
using the two grating lids and mounting one of the grating lids onto the L-shape flange member of the other grating lid so as to link the grating lids; and
further interconnecting the male fitting portion and the female fitting portion of the trough bodies, thereby forming a track in which a large number of the grating lids and the trough bodies are repeatedly interconnected with one another, respectively.

17. The trough track forming method according to claim 16, wherein the trough bodies and the grating lids are disposed such that a direction of the male fitting portion of the trough body is opposite to a direction of the L-shape flange member of the grating lid.

18. The structure for attaching the grating lid onto the trough body according to claim 10, wherein inner parts of the gratings of the grating lid are filled with either by aggregate including at least one of ceramics and natural stones that is solidified by adhesive resin such as epoxy resin or urethane resin, or by mortar.

19. The structure for attaching the grating lid onto the trough body according to claim 7, wherein instead of attaching the L-shape members for accommodating the grating lid, a resin-made trough lid can be fixed directly to the mounting portions for metallic fixing members of the horizontal ribs.

20. A grating lid that is to be fixed on an upper part of side sections of a trough body, the grating lid comprising:
a structure in which multiple gratings are formed inside a substantially rectangular-shaped frame body, wherein
a part of the gratings is notched at proximities of each of the front and back ends of the grating lid;
a steel plate with a mounting hole is welded to the notched parts to form bolt fixing sections of the grating lid; and
an L-shape flange member, which is bent into an L shape, is fixed to one side of a longitudinal direction of the grating lid, the L-shape flange member being formed with a tongue-shaped projection that has a length equivalent to a connected part between the trough bodies.

21. The grating lid according to claim 20, wherein inner parts of the gratings of the grating lid are filled with either by aggregate including at least one of ceramics and natural stones that is solidified by adhesive resin such as epoxy resin or urethane resin, or by mortar.

22. The grating lid according to claim 21, the grating lid further comprising:
an LED light source that is disposed inside at least a part of the grating, the LED light source being mounted on a substrate, wherein
the LED light source is fixed with epoxy resin or urethane resin that is filled inside the gratings; and
the substrate is disposed on a back surface of the grating lid.

* * * * *